United States Patent
Spivack et al.

(10) Patent No.: US 9,613,149 B2
(45) Date of Patent: Apr. 4, 2017

(54) AUTOMATIC MAPPING OF A LOCATION IDENTIFIER PATTERN OF AN OBJECT TO A SEMANTIC TYPE USING OBJECT METADATA

(75) Inventors: Nova T. Spivack, San Francisco, CA (US); Scott White, Seattle, WA (US); James M. Wissner, San Francisco, CA (US)

(73) Assignee: VCVC III LLC, Seattle, WA (US)

( * ) Notice: Subject to any disclaimer, the term of this patent is extended or adjusted under 35 U.S.C. 154(b) by 211 days.

(21) Appl. No.: 13/450,416

(22) Filed: Apr. 18, 2012

(65) Prior Publication Data

US 2012/0203734 A1    Aug. 9, 2012

Related U.S. Application Data

(63) Continuation of application No. 12/489,352, filed on Jun. 22, 2009, now Pat. No. 8,200,617.

(60) Provisional application No. 61/169,662, filed on Apr. 15, 2009, provisional application No. 61/169,677, filed on Apr. 15, 2009, provisional application No. 61/169,669, filed on Apr. 15, 2009.

(51) Int. Cl.
*G06F 17/30* (2006.01)

(52) U.S. Cl.
CPC ................ *G06F 17/3087* (2013.01)

(58) Field of Classification Search
CPC ......... G06F 17/30864; G06F 17/30867; G06F 17/30067; G06F 17/3087
USPC ........................................ 707/705, 602, 748
See application file for complete search history.

(56) References Cited

U.S. PATENT DOCUMENTS

| 5,408,567 A | 4/1995 | Hamilton |
| 5,408,657 A | 4/1995 | Bigelow et al. |

(Continued)

FOREIGN PATENT DOCUMENTS

| EP | 1310884 A2 | 5/2003 |
| JP | 2007094592 A | 4/2007 |

(Continued)

OTHER PUBLICATIONS

Aleman-Meza, Boanerges, et al., "Ranking Complex Relationships on the Semantic Web", IEEE Internet Computing, vol. 9 Issue 3, May/Jun. 2005, pp. 37-44.*

(Continued)

*Primary Examiner* — Robert Stevens
(74) *Attorney, Agent, or Firm* — Perkins Coie LLP

(57) ABSTRACT

Systems and methods for automatic mapping of a location identifier pattern of an object to a semantic type using object metadata are disclosed. In one aspect, embodiments of the present disclosure include a method, which may be implemented on a system, of identifying a set of tags associated with a website that is hosted by a web server. The method further includes, detecting a web page in the website in which a tag of the set of tags is identified, extracting a pattern from a Universal Resource Locator (URL) of the web page, and/or storing the pattern in a database embodied in a machine-readable storage medium as being mapped to the semantic type. The tag corresponds to a semantic type with which the content embodied in the web page has a semantic relationship and the pattern corresponds to the semantic type with which the content embodied in the web page has a semantic relationship.

65 Claims, 19 Drawing Sheets

(56) References Cited

U.S. PATENT DOCUMENTS

| | | |
|---|---|---|
| 5,515,532 A | 5/1996 | Iijima |
| 5,548,749 A | 8/1996 | Kroenke et al. |
| 5,717,924 A | 2/1998 | Kawai |
| 5,809,297 A | 9/1998 | Kroenke et al. |
| 5,819,086 A | 10/1998 | Kroenke |
| 5,873,077 A | 2/1999 | Kanoh et al. |
| 5,905,498 A | 5/1999 | Diament |
| 5,925,100 A | 7/1999 | Drewry et al. |
| 5,966,686 A | 10/1999 | Heidorn et al. |
| 6,173,287 B1 | 1/2001 | Eberman et al. |
| 6,311,194 B1 * | 10/2001 | Sheth .............. G06F 17/30595 707/E17.095 |
| 6,363,377 B1 | 3/2002 | Kravets et al. |
| 6,411,952 B1 * | 6/2002 | Bharat .............. G06F 17/30864 |
| 6,418,433 B1 * | 7/2002 | Chakrabarti ...... G06F 17/30864 |
| 6,499,021 B1 | 12/2002 | Abu-Hakima et al. |
| 6,513,059 B1 | 1/2003 | Gupta et al. |
| 6,516,315 B1 | 2/2003 | Gupta |
| 6,530,083 B1 | 3/2003 | Liebenow |
| 6,633,869 B1 | 10/2003 | Duparcmeur et al. |
| 6,643,650 B1 | 11/2003 | Slaughter et al. |
| 6,654,741 B1 | 11/2003 | Cohen et al. |
| 6,704,729 B1 | 3/2004 | Klein et al. |
| 6,711,585 B1 | 3/2004 | Copperman et al. |
| 6,741,744 B1 | 5/2004 | Hsu |
| 6,748,441 B1 | 6/2004 | Gemmell |
| 6,785,688 B2 * | 8/2004 | Abajian .............. G06F 17/3002 707/700 |
| 6,789,077 B1 | 9/2004 | Slaughter et al. |
| 6,816,850 B2 | 11/2004 | Culliss |
| 6,816,857 B1 | 11/2004 | Weissman et al. |
| 6,839,701 B1 | 1/2005 | Baer et al. |
| 6,847,974 B2 | 1/2005 | Wachtel |
| 6,859,807 B1 | 2/2005 | Knight et al. |
| 6,868,447 B1 | 3/2005 | Slaughter et al. |
| 6,941,300 B2 * | 9/2005 | Jensen-Grey ....... G06F 17/3002 707/710 |
| 6,996,566 B1 | 2/2006 | George et al. |
| 6,999,959 B1 * | 2/2006 | Lawrence ......... G06F 17/30864 |
| 7,072,883 B2 | 7/2006 | Potok et al. |
| 7,092,928 B1 | 8/2006 | Elad et al. |
| 7,093,200 B2 | 8/2006 | Schreiber et al. |
| 7,177,798 B2 | 2/2007 | Hsu et al. |
| 7,185,075 B1 | 2/2007 | Mishra et al. |
| 7,197,451 B1 | 3/2007 | Carter et al. |
| 7,200,862 B2 | 4/2007 | Murching et al. |
| 7,216,002 B1 | 5/2007 | Anderson |
| 7,246,164 B2 | 7/2007 | Lehmann et al. |
| 7,260,573 B1 | 8/2007 | Jeh et al. |
| 7,284,196 B2 | 10/2007 | Skeen et al. |
| 7,343,365 B2 | 3/2008 | Farnham et al. |
| 7,398,201 B2 * | 7/2008 | Marchisio ............ G06F 17/271 704/9 |
| 7,398,261 B2 | 7/2008 | Spivack et al. |
| 7,401,087 B2 | 7/2008 | Copperman et al. |
| 7,433,876 B2 | 10/2008 | Spivack et al. |
| 7,516,401 B2 * | 4/2009 | Chen .................. G06F 17/30905 715/227 |
| 7,536,323 B2 | 5/2009 | Hsieh |
| 7,584,208 B2 | 9/2009 | Spivack et al. |
| 7,640,267 B2 | 12/2009 | Spivack et al. |
| 7,707,161 B2 | 4/2010 | Hall et al. |
| 7,730,094 B2 | 6/2010 | Kaler et al. |
| 7,739,121 B2 | 6/2010 | Jain et al. |
| 7,774,380 B2 | 8/2010 | Burke et al. |
| 7,774,388 B1 | 8/2010 | Runchey |
| 7,793,209 B2 | 9/2010 | Kikuchi |
| 7,814,111 B2 | 10/2010 | Levin |
| 7,895,235 B2 | 2/2011 | Baeza-Yates et al. |
| 7,933,914 B2 | 4/2011 | Ramsey et al. |
| 7,966,564 B2 | 6/2011 | Catlin et al. |
| 8,020,206 B2 | 9/2011 | Hubbard et al. |
| 8,024,328 B2 | 9/2011 | Dolin et al. |
| 8,046,227 B2 | 10/2011 | Starkie |
| 8,050,935 B2 | 11/2011 | Plutowski et al. |
| 8,103,676 B2 | 1/2012 | Bedrax-Weiss et al. |
| 8,126,890 B2 * | 2/2012 | Bobick .............. G06F 17/30731 704/9 |
| 8,135,831 B2 | 3/2012 | Sinclair et al. |
| 8,150,859 B2 | 4/2012 | Vadlamani et al. |
| 8,161,066 B2 | 4/2012 | Spivack et al. |
| 8,166,010 B2 | 4/2012 | Ives |
| 8,176,079 B1 | 5/2012 | Spertus |
| 8,190,684 B2 | 5/2012 | Spivack et al. |
| 8,200,617 B2 | 6/2012 | Spivack et al. |
| 8,275,796 B2 | 9/2012 | Spivack et al. |
| 8,281,361 B1 | 10/2012 | Schepis et al. |
| 8,438,124 B2 | 5/2013 | Spivack et al. |
| 8,539,552 B1 | 9/2013 | Grabelsky et al. |
| 8,645,367 B1 * | 2/2014 | Hajaj ................ G06F 17/30864 707/727 |
| 8,688,742 B2 | 4/2014 | Fischer et al. |
| 8,843,536 B1 | 9/2014 | Elbaz et al. |
| 8,862,579 B2 | 10/2014 | Wissner et al. |
| 8,868,560 B2 | 10/2014 | Spivack et al. |
| 8,924,838 B2 | 12/2014 | Spivack et al. |
| 8,965,979 B2 | 2/2015 | Spivack et al. |
| 9,020,967 B2 | 4/2015 | Spivack et al. |
| 9,037,567 B2 | 5/2015 | Wissner et al. |
| 9,189,479 B2 | 11/2015 | Spivack et al. |
| 2001/0003828 A1 | 6/2001 | Peterson et al. |
| 2001/0049700 A1 | 12/2001 | Ichikura |
| 2002/0023122 A1 | 2/2002 | Polizzi et al. |
| 2002/0049689 A1 | 4/2002 | Venkatram |
| 2002/0052894 A1 | 5/2002 | Bourdoncle et al. |
| 2002/0055936 A1 | 5/2002 | Cheng et al. |
| 2002/0059223 A1 | 5/2002 | Nash et al. |
| 2002/0069100 A1 | 6/2002 | Arberman |
| 2002/0077803 A1 | 6/2002 | Kudoh et al. |
| 2002/0082900 A1 | 6/2002 | Johnson |
| 2002/0099696 A1 * | 7/2002 | Prince ................ G06F 17/3002 |
| 2002/0099737 A1 * | 7/2002 | Porter ................ G06F 17/3002 715/255 |
| 2002/0103777 A1 | 8/2002 | Zhang |
| 2002/0103920 A1 | 8/2002 | Berkun et al. |
| 2002/0147748 A1 | 10/2002 | Huang et al. |
| 2002/0161626 A1 | 10/2002 | Plante et al. |
| 2002/0184111 A1 | 12/2002 | Swanson |
| 2002/0194154 A1 | 12/2002 | Levy et al. |
| 2002/0194181 A1 | 12/2002 | Wachtel |
| 2002/0194201 A1 | 12/2002 | Wilbanks et al. |
| 2003/0028871 A1 | 2/2003 | Wang et al. |
| 2003/0046344 A1 | 3/2003 | Kumhyr et al. |
| 2003/0074356 A1 | 4/2003 | Kaler et al. |
| 2003/0093551 A1 | 5/2003 | Taylor et al. |
| 2003/0120730 A1 | 6/2003 | Kuno et al. |
| 2003/0126136 A1 | 7/2003 | Omoigui |
| 2003/0133556 A1 | 7/2003 | Naik et al. |
| 2003/0144892 A1 | 7/2003 | Cowan et al. |
| 2003/0144988 A1 | 7/2003 | Nareddy et al. |
| 2003/0149934 A1 | 8/2003 | Worden |
| 2003/0158937 A1 | 8/2003 | Johal et al. |
| 2003/0163513 A1 | 8/2003 | Schaeck et al. |
| 2003/0208472 A1 | 11/2003 | Pham |
| 2003/0233224 A1 * | 12/2003 | Marchisio ............ G06F 17/271 704/4 |
| 2004/0012773 A1 | 1/2004 | Puttkammer |
| 2004/0054671 A1 * | 3/2004 | Cohen ............... G06F 17/30887 |
| 2004/0073430 A1 | 4/2004 | Desai et al. |
| 2004/0083199 A1 | 4/2004 | Govindugari et al. |
| 2004/0083211 A1 | 4/2004 | Bradford |
| 2004/0088325 A1 | 5/2004 | Elder et al. |
| 2004/0093381 A1 | 5/2004 | Hodges et al. |
| 2004/0111386 A1 | 6/2004 | Goldberg et al. |
| 2004/0122977 A1 | 6/2004 | Moran et al. |
| 2004/0143716 A1 | 7/2004 | Hong |
| 2004/0153467 A1 | 8/2004 | Conover .......... G06F 17/30707 |
| 2004/0158455 A1 * | 8/2004 | Spivack ............ G06F 17/30731 704/9 |
| 2004/0162773 A1 | 8/2004 | Del Rey et al. |
| 2004/0181525 A1 | 9/2004 | Itzhak et al. |
| 2004/0181604 A1 | 9/2004 | Immonen |
| 2004/0194181 P1 | 9/2004 | Iwaki |

(56) References Cited

U.S. PATENT DOCUMENTS

| | | | |
|---|---|---|---|
| 2004/0210602 A1 | 10/2004 | Hillis et al. | |
| 2004/0220893 A1* | 11/2004 | Spivack | G06F 9/4443 706/46 |
| 2004/0230572 A1* | 11/2004 | Omoigui | G06F 17/30528 |
| 2004/0230634 A1 | 11/2004 | Busaba et al. | |
| 2004/0230676 A1* | 11/2004 | Spivack | G06F 17/30908 709/223 |
| 2004/0249795 A1 | 12/2004 | Brockway et al. | |
| 2004/0260680 A1 | 12/2004 | Best et al. | |
| 2004/0260701 A1 | 12/2004 | Lehikoinen et al. | |
| 2005/0004978 A1 | 1/2005 | Reed et al. | |
| 2005/0015357 A1 | 1/2005 | Shahidi | |
| 2005/0021862 A1 | 1/2005 | Schroeder et al. | |
| 2005/0027708 A1 | 2/2005 | Mueller et al. | |
| 2005/0055644 A1 | 3/2005 | Stockton | |
| 2005/0080775 A1 | 4/2005 | Colledge et al. | |
| 2005/0114487 A1 | 5/2005 | Peng et al. | |
| 2005/0131778 A1 | 6/2005 | Bennett et al. | |
| 2005/0144158 A1 | 6/2005 | Capper et al. | |
| 2005/0144162 A1 | 6/2005 | Liang | |
| 2005/0149510 A1 | 7/2005 | Shafrir | |
| 2005/0154746 A1 | 7/2005 | Liu et al. | |
| 2005/0160065 A1 | 7/2005 | Seeman | |
| 2005/0165743 A1 | 7/2005 | Bharat et al. | |
| 2005/0177568 A1* | 8/2005 | Diamond | G06F 17/3002 |
| 2005/0210000 A1 | 9/2005 | Michard | |
| 2005/0223189 A1 | 10/2005 | Khan et al. | |
| 2005/0267871 A1* | 12/2005 | Marchisio | G06F 17/30672 |
| 2005/0267872 A1 | 12/2005 | Galai et al. | |
| 2005/0278390 A1* | 12/2005 | Kaler | G06F 21/6218 |
| 2006/0004703 A1* | 1/2006 | Spivack | G06F 17/3089 |
| 2006/0004717 A1 | 1/2006 | Ramarathnam et al. | |
| 2006/0004732 A1 | 1/2006 | Odom | |
| 2006/0004892 A1 | 1/2006 | Lunt et al. | |
| 2006/0020596 A1 | 1/2006 | Liu et al. | |
| 2006/0026147 A1 | 2/2006 | Cone et al. | |
| 2006/0028803 A1 | 2/2006 | Pocrass | |
| 2006/0031288 A1 | 2/2006 | Ter Horst et al. | |
| 2006/0074726 A1 | 4/2006 | Forbes et al. | |
| 2006/0074980 A1 | 4/2006 | Sarkar | |
| 2006/0151507 A1 | 7/2006 | Swartz et al. | |
| 2006/0168510 A1 | 7/2006 | Bryar et al. | |
| 2006/0184617 A1 | 8/2006 | Nicholas et al. | |
| 2006/0200434 A1 | 9/2006 | Flinn et al. | |
| 2006/0200478 A1 | 9/2006 | Pasztor et al. | |
| 2006/0213976 A1 | 9/2006 | Inakoshi et al. | |
| 2006/0230011 A1 | 10/2006 | Tuttle et al. | |
| 2006/0235873 A1 | 10/2006 | Thomas | |
| 2006/0242013 A1 | 10/2006 | Agarwal et al. | |
| 2006/0242574 A1 | 10/2006 | Richardson et al. | |
| 2006/0248045 A1 | 11/2006 | Toledano et al. | |
| 2006/0259357 A1 | 11/2006 | Chiu | |
| 2006/0265397 A1 | 11/2006 | Bryan et al. | |
| 2006/0287989 A1 | 12/2006 | Glance | |
| 2007/0016771 A1 | 1/2007 | Allison et al. | |
| 2007/0027865 A1 | 2/2007 | Bartz et al. | |
| 2007/0038610 A1 | 2/2007 | Omoigui | |
| 2007/0038643 A1 | 2/2007 | Epstein | |
| 2007/0050338 A1 | 3/2007 | Strohm et al. | |
| 2007/0061198 A1 | 3/2007 | Ramer et al. | |
| 2007/0081197 A1 | 4/2007 | Omoigui | |
| 2007/0118802 A1 | 5/2007 | Gerace et al. | |
| 2007/0121843 A1 | 5/2007 | Atazky et al. | |
| 2007/0124202 A1 | 5/2007 | Simons | |
| 2007/0143502 A1 | 6/2007 | Garcia-Martin et al. | |
| 2007/0174270 A1 | 7/2007 | Goodwin et al. | |
| 2007/0179954 A1 | 8/2007 | Kudoh et al. | |
| 2007/0203903 A1 | 8/2007 | Attaran Rezaei et al. | |
| 2007/0208703 A1 | 9/2007 | Shi et al. | |
| 2007/0219976 A1* | 9/2007 | Muralidhar | G06F 17/30914 |
| 2007/0220893 A1 | 9/2007 | Woltmann et al. | |
| 2007/0250468 A1* | 10/2007 | Pieper | G06F 17/30867 |
| 2007/0260598 A1 | 11/2007 | Odom | |
| 2008/0010291 A1 | 1/2008 | Poola et al. | |
| 2008/0010292 A1 | 1/2008 | Poola | |
| 2008/0021924 A1 | 1/2008 | Hall et al. | |
| 2008/0059519 A1 | 3/2008 | Grifftih | |
| 2008/0091656 A1 | 4/2008 | Charnock et al. | |
| 2008/0109212 A1 | 5/2008 | Witbrock et al. | |
| 2008/0147788 A1 | 6/2008 | Omoigui | |
| 2008/0148193 A1 | 6/2008 | Moetteli | |
| 2008/0172293 A1* | 7/2008 | Raskin | G06Q 10/04 705/14.1 |
| 2008/0183694 A1 | 7/2008 | Cane et al. | |
| 2008/0189267 A1 | 8/2008 | Spivack et al. | |
| 2008/0235383 A1 | 9/2008 | Schneider | |
| 2008/0243838 A1 | 10/2008 | Scott et al. | |
| 2008/0262964 A1 | 10/2008 | Bezos et al. | |
| 2008/0270428 A1 | 10/2008 | McNamara et al. | |
| 2008/0287096 A1 | 11/2008 | Aaltonen et al. | |
| 2008/0306959 A1* | 12/2008 | Spivack | G06F 17/3089 |
| 2009/0006974 A1 | 1/2009 | Harinarayan et al. | |
| 2009/0012991 A1 | 1/2009 | Johnson et al. | |
| 2009/0030982 A1 | 1/2009 | Spivack et al. | |
| 2009/0063538 A1* | 3/2009 | Chitrapura | G06F 17/30887 |
| 2009/0076887 A1 | 3/2009 | Spivack et al. | |
| 2009/0077062 A1 | 3/2009 | Spivack et al. | |
| 2009/0077094 A1 | 3/2009 | Bodain | |
| 2009/0077124 A1 | 3/2009 | Spivack et al. | |
| 2009/0077531 A1 | 3/2009 | Miloslavsky et al. | |
| 2009/0089278 A1* | 4/2009 | Poola | G06F 17/30864 |
| 2009/0089286 A1 | 4/2009 | Kumar et al. | |
| 2009/0106307 A1 | 4/2009 | Spivack | |
| 2009/0138565 A1 | 5/2009 | Shiff et al. | |
| 2009/0144240 A1 | 6/2009 | Singh et al. | |
| 2009/0171984 A1* | 7/2009 | Park | G06F 17/3089 |
| 2009/0192972 A1 | 7/2009 | Spivack et al. | |
| 2009/0192976 A1 | 7/2009 | Spivack et al. | |
| 2009/0234711 A1* | 9/2009 | Ramer et al. | 705/10 |
| 2009/0240638 A1 | 9/2009 | Kirpal et al. | |
| 2009/0254414 A1 | 10/2009 | Schwarz et al. | |
| 2009/0254971 A1 | 10/2009 | Herz et al. | |
| 2009/0327304 A1 | 12/2009 | Agarwal et al. | |
| 2010/0004975 A1 | 1/2010 | White et al. | |
| 2010/0046842 A1* | 2/2010 | Conwell | 382/218 |
| 2010/0057815 A1 | 3/2010 | Spivack et al. | |
| 2010/0070448 A1 | 3/2010 | Omoigui | |
| 2010/0070542 A1 | 3/2010 | Feinsmith | |
| 2010/0094952 A1 | 4/2010 | Lindgren et al. | |
| 2010/0100545 A1 | 4/2010 | Jeavons | |
| 2010/0153160 A1 | 6/2010 | Bezemer et al. | |
| 2010/0223295 A1 | 9/2010 | Stanley et al. | |
| 2010/0235918 A1 | 9/2010 | Mizrahi et al. | |
| 2010/0262592 A1 | 10/2010 | Brawer et al. | |
| 2010/0268596 A1 | 10/2010 | Wissner et al. | |
| 2010/0268700 A1 | 10/2010 | Wissner et al. | |
| 2010/0268702 A1 | 10/2010 | Wissner et al. | |
| 2010/0268720 A1 | 10/2010 | Spivack et al. | |
| 2011/0066525 A1 | 3/2011 | Hulst et al. | |
| 2012/0010867 A1 | 1/2012 | Eder | |
| 2012/0110008 A1* | 5/2012 | Pieper | G06F 17/3089 707/769 |
| 2012/0278163 A1 | 11/2012 | Spivack et al. | |
| 2013/0132386 A1 | 5/2013 | Runchey | |
| 2013/0204872 A1 | 8/2013 | Runchey | |
| 2014/0032529 A1 | 1/2014 | Chang | |
| 2014/0337332 A1 | 11/2014 | Wissner et al. | |
| 2015/0032716 A1 | 1/2015 | Wissner et al. | |
| 2015/0039655 A1 | 2/2015 | Spivack et al. | |
| 2015/0100870 A1 | 4/2015 | Spivack et al. | |
| 2015/0248496 A1 | 9/2015 | Wissner et al. | |
| 2015/0304400 A1 | 10/2015 | Spivack et al. | |

FOREIGN PATENT DOCUMENTS

| | | |
|---|---|---|
| KR | 20010028737 A | 4/2001 |
| KR | 20040017824 A | 2/2004 |
| KR | 20050023583 A | 3/2005 |
| KR | 20060046522 | 5/2006 |
| KR | 20060117707 | 11/2006 |
| KR | 20070061116 A | 6/2007 |
| WO | WO-2007032003 A2 | 3/2007 |
| WO | 2010120941 A2 | 10/2010 |
| WO | WO-2010120925 | 10/2010 |

(56) References Cited

FOREIGN PATENT DOCUMENTS

| WO | WO-2010120929 | 10/2010 |
|---|---|---|
| WO | WO-2010120934 | 10/2010 |
| WO | WO-2010120941 | 10/2010 |

OTHER PUBLICATIONS

Sheth, Amit P., et al., "Semantic (Web) Technology in Action: Ontology Driven Information Systems for Search, Integration, and Analysis", IEEE Data Engineering Bulletin, vol. 26, No. 4, Dec. 2003, 11 pages.*
Artz, Donovan, et al., "A survey of trust in computer science and the Semantic Web", Web Semantics: Science, Services and Agents on the World Wide Web, vol. 5, © 2007, pp. 58-71.*
Choi, Yun, et al., "Refinement Method of Post-processing and Training for Improvement of Automated Text Classification", ICCSA 2006, LNCS 3981, Springer-Verlag, Berlin, Germany, © 2006, pp. 298-308.*
Jøsang, Audun, et al., "A survey of trust and reputation systems for online service provision", Decision Support Systems, vol. 43, © 2007, pp. 618-644.*
The American Heritage College Dictionary, 4th Edition, Houghton Mifflin Company, Boston, MA, © 2002, p. 1260.*
Svatek, Vojtech, et al., "URL as a starting point for WWW document categorisation", RIAO 2000, College of France de France, Paris, France, Apr. 12-14, 2000, pp. 1693-1702.*
Shih, Lawrence Kai, et al., "Using URLS and Table Layout for Web Classification Tasks", WWW 2004, New York, NY, May 17-22, 2004, pp. 193-202.*
Kules, Bill, et al., "Categorizing Web Search Results into Meaningful and Stable Categories Using Fast-Feature Techniques", JCDL '06, Chapel Hill, NC, Jun. 11-15, 2006, pp. 210-219.*
Stojanovic, Nenad, et al., "SEAL—A Framework for Developing SEmantic PortALs", K-CAP '01, Victoria, British Columbia, Canada, Oct. 22-23, 2001, pp. 155-162.*
Chiang, Roger H. L., et al., "A smart web query method for semantic retrieval of web data", Data & Knowledge Engineering, vol. 38, © 2001, pp. 63-84.*
Stumme, Gerd, et al., "Semantic Web Mining—State of the art and future directions", Web Semantics: Science, Services and Agents, vol. 4, (c) 2006, pp. 124-143.*
U.S. Appl. No. 11/874,881, filed Oct. 18, 2007, System and Method of a Knowledge Management and Networking Environment.
U.S. Appl. No. 11/874,882, filed Oct. 18, 2007, System and Method of a Knowledge Management and Networking Environment.
U.S. Appl. No. 12/168,034, filed Jul. 3, 2008, System and Method for Leveraging Proximity Data in a Web-Based Socially-Enabled Knowledge Networking Environment.
U.S. Appl. No. 12/244,740, filed Oct. 2, 2008, System of a Knowledge Management and Networking Environment and Method for Providing Advanced Functions Therefor.
U.S. Appl. No. 10/719,002, filed Nov. 20, 2003, Methods and Systems for Managing Entities in a Computing Device Using Semantic Objects.
U.S. Appl. No. 12/616,085, filed Nov. 10, 2009, Semantically Representing a Target Entity Using a Semantic Object.
U.S. Appl. No. 10/719,652, filed Nov. 20, 2003, Method and System for Managing and Tracking Semantic Objects.
U.S. Appl. No. 10/720,031, filed Nov. 20, 2003, Methods and Systems for Managing Offers and Requests in a Network.
U.S. Appl. No. 12/359,230, filed Jan. 23, 2009, Methods and Systems for Creating a Semantic Object.
U.S. Appl. No. 11/062,125, filed Feb. 19, 2005, Semantic Web Portal and Platform.
U.S. Appl. No. 12/197,207, filed Aug. 22, 2008, Semantic Web Portal and Platform.
U.S. Appl. No. 13/612,714, filed Sep. 12, 2012, Semantic Web Portal and Platform.
U.S. Appl. No. 11/835,079, filed Aug. 7, 2007, Harvesting Data From Page.
U.S. Appl. No. 12/104,366, filed Apr. 16, 2008, Methods and Systems for Semantically Managing Offers and Requests Over a Network.
U.S. Appl. No. 13/455,096, filed Apr. 24, 2012, Methods and Systems for Semantically Managing Offers and Requests Over a Network.
U.S. Appl. No. 12/760,387, filed Apr. 14, 2010, Search and Search Optimization Using a Pattern of a Location Identifier.
U.S. Appl. No. 12/760,411, filed Apr. 14, 2010, Generating User-Customized Search Results and Building a Semantics-Enhanced Engine.
U.S. Appl. No. 12/760,424, filed Apr. 14, 2010, Search Enhanced Engine Advertising.
U.S. Appl. No. 12/489,352, filed Jun. 22, 2009, Automatic Mapping of a Location Identifier Pattern of an Object to a Semantic Type Using Object Metadata.
"Improved markup language for semantic Web using object oriented technology, 21-24"—Kangchan, et al., IEEE, vol. 1, Sep. 2003 (pp. 330-334).
"Ontology-Driven Peer Profiling in Peer-to-Peer Enabled Semantic Web"—Olena Parhomenko, Yugyung Lee, E.K. Park-CIKM'03 Information and Knowledge Management Nov. 2003 (pp. 564-567).
"Re-integrating the research record"—Myers, et al., IEEE vol. 5, May-Jun. 2003 (pp. 44-50).
"SEAL—A Framework for Developing SEmanatic PortALS"— Nenad Stojanovic, Aleanander Maedche, Steffen Staab, Rudi Studer and York Sure, K=CAP'01', Oct. 22-23, 2001 ACM (pp. 155-162).
"Semanatic-Based Approach to Component Retrieval"—Vijayan Sugumaran and Veda C. Storey—ACM SIGMIS Database vol. 24, issue 3 Aug. 2003 (pp. 8-24).
'A klog apart' [online]. Dijest.com 2003. [Retrieved on May 3, 2007]:<URL:htt://www.dijest.com/aka/2003/06/20.html>, 9 pages.
'Blogs as information spaces' [on-line]. Reflective Surface, 2003, [retrieved on May 3, 2007]. Retrieved form the Internet :< URL: http://log.reflectivesurface.com/2003/12/>, 6 pages.
'Development Notebook' [online]. Dannyayers, 2003, [retrieved on May 4, 2007]. Retrieved from the Internet: URL: webarchive.org/web/20031012055838/http://dannyayers.com/ideagraph-blog/archives/cat_jemblog.html>, 6 pages.
'Organizing weblogs by topic' [online]. Read/Write Web, 2003, [retrieved on May 3, 2007]. Retrieved from the Internet: <URL: http://www.readwriteweb.com/archives/organizing_webl.php>, 3 pages.
'Semantic Email' [online]. University of Washington, [retrieved on May 3, 2007]. Retrieved from the Internet :<URL:http://www.cs.washington.edu/research/semweb/email.html>, 2 pages.
'Semantic link' [online]. Meta, 2005 [retrieved on May 3, 2007]. Retrieved on the Internet :<URL: http://meta.wikimedia.org/wiki/Semantic_link>, 1 page.
A. Hotho et al., "Information Retrieval in Folksonomies: Search and Ranking," ESWC 2006, pp. 411-426.
Cass, "A Fountain of Knowledge," IEEE Spectrum, Jan. 2004, pp. 68-75.
Choi, Y. et al., "Refinement Method of Post-Processing and Training for Improvement of Automated Text Classification", Computational Science and its Applications—ICCSA 2006: International Conference, Glasgow, UK, May 8-11, 2006, pp. 298-308.
International Search Report PCT/US07/75379; dated Aug. 5, 2008.
International Search Report PCT/US2008/010596 dated Mar. 24, 2009.
International Search Report PCT/US2008/011474 dated May 29, 2009.
International Search Report PCT/US2010/031090 dated Nov. 2, 2010; pp. 1-3.
International Search Report PCT/US2010/031096 dated Nov. 22, 2010; pp. 1-3.
International Search Report PCT/US2010/031101dated Nov. 26, 2010; pp. 1-3.
International Search Report PCT/US2010/031111 dated Nov. 26, 2010; pp. 1-3.

(56) References Cited

OTHER PUBLICATIONS

International Search Report PCT/US2010/039381 dated Jan. 5, 2011 pp. 1-3.
Microsoft Computer Dictionary, p. 181, Microsoft Press, 5th ed., 2002.
Kudelka, et al., "Semantic Annotation of Web Pages Using Web Patterns", IEEE/WIC/ACM International Conference on Web Intelligence, Dec. 18, 2006, pp. 1-12.
S. Decker and M. Frank, "The Social Semantic Desktop," DERI Technical Report May 2, 2004, May 2004, pp. 1-7.
Supplementary Search Report EP 08 839486 Dated Dec. 27, 2010 pp. 1-8.
W. Fang et al., "Toward a Semantic Search Engine Based on Ontologies," Proc. 4th Int'l Conf. on Mach. Learning and Cybernetics, Aug. 2005, pp. 1913-1918.
Written Punition PCT/US208/010596 dated Mar. 24, 2009, pp. 1-5.
Written Opinion PCT/US2010/031096 dated Nov. 22, 2010dated; pp. 1-4.
Written Opinion PCT/US2010/031101 dated Nov. 26, 2010dated; pp. 1-4.
Written Opinion PCT/US2010/031111 dated Nov. 26, 2010dated; pp. 1-6.
X. Shen, B. Tan, and X. Zhai, "Context-sensitive information retrieval using implicit feedback," Proc. SIGIR '05, pp. 43-50.
Kashyap et al., "Semantic and Schematic Similarities Between Database Objects: a Context-Based Approach," VLUB Journal, © Springer-Verlag 1996, pp. 1-29.
Lee et al., "Development of a Concurrent Mold Design System: a Knowledge-based Approach," Computer Integrated Manufacturing Systems, vol. 10, Issue 4, Oct. 1997, pp. 287-307.
Devedžić, "A Survey of Modern Knowledge Modeling Techniques," Expert Systems with Applications, vol. 17, Issue 4, Nov. 1999, pp. 275-294.
Maedche, "Layered Ontology Engineering," Ontology Learning for the Semantic Web, The Kluwer International Series in Engineering and Computer Science vol. 665, 2002, pp. 29-55.
Evans et al., "The Resource Locator Service: fixing a flaw in the web," Computer Networks, vol. 37, Issues 3-4, Nov. 5, 2001, pp. 307-330. [Why are these in bigger fonts? Please use the same font in general.]
International Search Report PCT/US2008/010337 dated Dec. 28, 2009; pp. 1-3.
International Search Report PCT/US2009/002867 dated Dec. 18, 2009; pp. 1-3.
Milos Kudelka, et al., "Semantic Annotation of Web Pages Using Web Patterns", IEEE/WIC/ACM International Conference on Web Intelligence, Dec. 18, 2006, pp. 1-12.
Written Opinion PCT/US2007/75379 dated Aug. 5, 2008, pp. 1-7.
Written Opinion PCT/US2008/010337 dated Dec. 28, 2009; pp. 1-3.
Written Opinion PCT/US2008/011474 dated May 29, 2009, pp. 1-5.
Written Opinion PCT/US2009/002867 dated Dec. 18, 2009; pp. 1-5.
Written Opinion PCT/US2010/031090; dated Nov. 2, 2010; pp. 1-6.
Written Opinion PCT/US2010/031096 dated Nov. 22, 2010; pp. 1-4.
Written Opinion PCT/US2010/031101 dated Nov. 26, 2010 dated; pp. 1-4.
Written Opinion PCT/US2010/031111 dated Nov. 26, 2010; pp. 1-6.
Written Opinion PCT/US2010/039381 dated Jan. 5, 2011 pp. 1-4.
Written Opinion PCT/US208/010596 dated Mar. 24, 2009, pp. 1-5.

* cited by examiner

FIG. 6

AUTOMATIC MAPPING OF A LOCATION IDENTIFIER PATTERN OF AN OBJECT TO A SEMANTIC TYPE USING OBJECT METADATA

CLAIM OF PRIORITY

This application is a continuation of U.S. patent application Ser. No. 12/489,352, filed Jun. 22, 2009, entitled "AUTOMATIC MAPPING OF A LOCATION IDENTIFIER PATTERN OF AN OBJECT TO A SEMANTIC TYPE USING OBJECT METADATA," which claims priority to U.S. Provisional Patent Application No. 61/169,662, entitled "SEARCH AND SEARCH OPTIMIZATION USING A PATTERN OF A LOCATION IDENTIFIER," which was filed on Apr. 15, 2009, U.S. Provisional Patent Application No. 61/169,669, entitled "GENERATING USER-CONTROLLED SEARCH RESULTS AND BUILDING A SEMANTICS-ENHANCED SEARCH ENGINE," which was filed Apr. 15, 2009, and U.S. Provisional Patent Application No. 61/169,677 entitled "SEARCH ENHANCED SEMANTIC ADVERTISING", which was filed on Apr. 15, 2009, the entirety of all these applications being expressly incorporated by reference herein.

TECHNICAL FIELD

This technology relates generally to search and search optimization of objects containing electronic content and in particular, to automating or semi-automating the mapping of a location identifier pattern of an object such as a web page to a semantic type.

BACKGROUND

The search through the vast amount of resources containing electronic content (e.g., digital music, digital video, documents, text files, web pages) in the digital world is increasingly becoming a resource consuming task. The mere task of executing the search based on a basic keyword comparison is daunting regardless of whether the scope of the search is within the confines of a local computing system, a private network, a local area network, or the World Wide Web.

The task of producing meaningful search results or even customized search results poses a yet further significant and seemingly impossible barrier to improving or enhancing a user's search experience. Furthermore, the prevalence of user-added or user-supplemented content has added to the difficulty and intricacy of performing search in an expedited manner while simultaneously producing meaningful results among the vast amount of available locally stored, shared, or globally available resources.

BRIEF DESCRIPTION OF THE DRAWINGS

FIG. 6 illustrates an example screenshot showing tags and/or semantic types by which the search results can be visually sorted and/or filtered when presented to a user.

DETAILED DESCRIPTION

Figure 1:
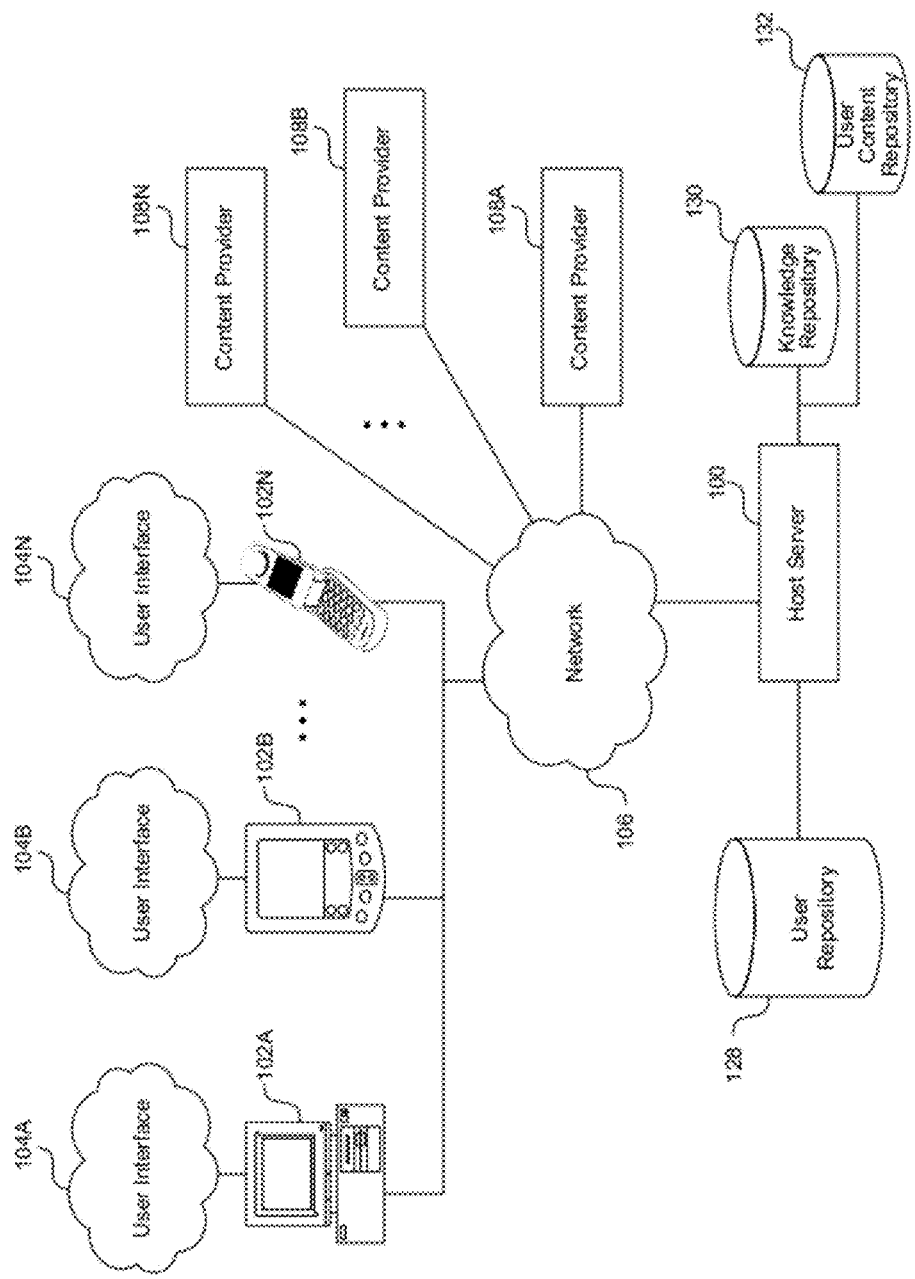
FIG. 1 illustrates an example block diagram of a host server that maps a location identifier pattern to a semantic type using metadata collected from users of user devices and various content sources/providers.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for mapping of an object's location identifier pattern to a semantic type using object metadata.

The techniques described herein are can generally be used to extract location identifier patterns for use in search and search optimization of electronic content including but not limited to electronic content that is distributed throughout the Internet or World Wide Web. The location identifier of electronic content or a source can be a web address that a web browser uses to locate the content of the source for access by a user via a web browser (e.g., Universal Resource Identifier (URI) or Universal Resource Locator (URL)).

In one example of the techniques described herein as applied to search for online content distributed via the Internet, information derived directly from extracting patterns and words in URLs and/or URIs provide a wealth of semantic information. The semantic information derived from the URLs and/or URIs can be used in searching for content based on semantics information and/or for semantically optimizing the search process.

By using URL/URI patterns for online content, the semantic information can be deduced and extracted using relatively lesser computing resources, effort, and time, for example, as compared to solely extracting such semantic information by performing various data mining techniques on the content source. Pattern recognition using URL/URI or other location identifiers allows semantic information of a vast number of content sources to be determined in a relatively short amount of time compared to traditional mechanism. The semantic information thus extracted facilitates and expedites the search process and to generate semantically-valuable search results.

In other words, the patterns extracted from URLs/URIs can be correlated to ontologically defined semantic types (e.g., entities, organizations, things, or intangible concepts, ideas, etc.) and/or their attributes (e.g., properties). In addition, patterns can be drawn between non-semantically marked up HTML or XHTML content and semantic types/attributes. In addition to using the correlated patterns and the extracted semantic information for enhanced search engine indexing, the patterns (e.g., from URIs/URLs and/or (X)HTML content) can be associated directly to types, properties, and/or attributes defined in one or more ontologies.

For example, metadata (e.g., Resource Description Framework (RDF) triples) can be automatically extracted from XML or XHTML documents (e.g., using GRDDL (Gleaning Resource Descriptions From Dialects of Languages)) to convert (X)HTML or other content to semantic content. This conversion and extraction of semantic data from content can be used for building or enhancement of a search engine.

In addition, object metadata can also be collected and identified from various information sources containing the object or otherwise having a reference to the object. In general, object metadata includes, by way of example but not limitation, user identified and/or user generated metadata relating to the object (e.g., web page). For example, user blogs, comments, reviews, tags, tweets, annotations, user ratings, bookmarks and/or other types of metadata about an object that is, for example, a web page, can be used to map (e.g., automatically or semi-automatically) a pattern of the object's location identifier (e.g., a URL or URI of a web page) to a semantic type. In some instances, the collection of object metadata is statistically analyzed before use in pattern mapping of various objects.

In general, the object or the content embodied therein has a semantic relationship with the semantic type mapped to by the pattern of the location identifier of the object. For example, the semantic relationship specifies a type of thing or concept that the content embodied in the object is relevant to (e.g., an "is-a" relationship). The semantic relationship may also specify a type of format that the content embodied in the object is of (e.g., a "has-format" relationship). In addition, the semantic relationship can specify a type of audience that the content embodied in the object is intended for (e.g., a "has-audience" relationship).

Patterns that have been mapped to semantic types can be used to facilitate and/or optimize the semantic searching of content embodied in objects (e.g., electronic object such as a web page) having location identifiers to which the mapped patterns can be matched. The matching of the mapped patterns to other location identifiers allows object having content of or (semantically) related to the semantic type to be accurately identified and presented in a set of search results while conserving bandwidth and other computing resources.

In addition, the objects can be sorted in a search results page according to the semantic relationship and/or the semantic type, using the mapped pattern. For example, a user can select to view all results that have content or refers to content that is intended for an audience of families or children. Similarly, a user can select to view all search results having video content, for example.

The mapping of the location identifier patterns to semantic types with which the associated object has a semantic relationship can be automated (e.g., fully automated or semi-automated) using such metadata collected from various information/content sources. Such automatic mapping can be used in lieu of or in conjunction with a less automated mechanism for mapping location identifier patterns to semantic types.

Note that the processes and techniques herein described are not limited to search and search optimization of web content or other online/shared content but also for search and search optimization of content sources stored locally on one computer/server, on a network of computers, and/or shared over a private network. Location identifiers and patterns thereof that can be used for search optimization, although described generally as including URIs and URLs, are not limited to such. Location identifiers such as file directories, file paths, network locations, and/or any other form of location identifiers for electronic content sources and the patterns thereof are contemplated and are also considered to be within the novel art of the disclosure.

FIG. 1 illustrates an example block diagram of a host server 100 that maps a location identifier pattern to a semantic type using metadata collected from users of client devices 102A-N and various content sources/providers 108A-N.

The client devices 102A-N can be any system and/or device, and/or any combination of devices/systems that is able to establish a connection with another device, a server and/or other systems. Client devices 102A-N each typically include a display and/or other output functionalities to present information and data exchanged among the devices 102A-N and the host server 100. For example, the client devices 102A-N can be any of, but are not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, and/or an iPhone, etc. In one embodiment, the client devices 102A-N and content providers 108A-N of electronic content are coupled to a network 106. In some embodiments, the devices 102A-N and host server 100 may be directly connected to one another.

In one embodiment, the host server 100 automatically maps location identifier patterns to semantic types using, for example, metadata collected from external sources/providers 108 including but not limited to user-identified and/or user-generated data. Additionally, the host server 100 can perform search and/or provide search optimization techniques and related services using the mapped location identifiers, the semantic types they are mapped to, and/or the types of semantic relationships the object and/or the content embodied therein has with the mapped semantic types. The search and search optimization can be performed using patterns of location identifiers (e.g., web addresses, URIs, URLs, file names, directories, network addresses, pathways, etc.) of objects (e.g., electronic objects including electronic content).

The automatic mapping of location identifiers patterns to semantic types can be further used by the host server 100 or other servers, engines, or specialized search engines for performing semantics-enhanced search that identifies and/or further categorizes web pages or other objects as having content of or related specific semantic types. In addition, the mapped patterns can be used (e.g., during search or in applications relating to sorting or categorization of content) to identify the types of semantic relationships to the mapped semantic types of objects and/or the content therein embodied.

Figure 3:
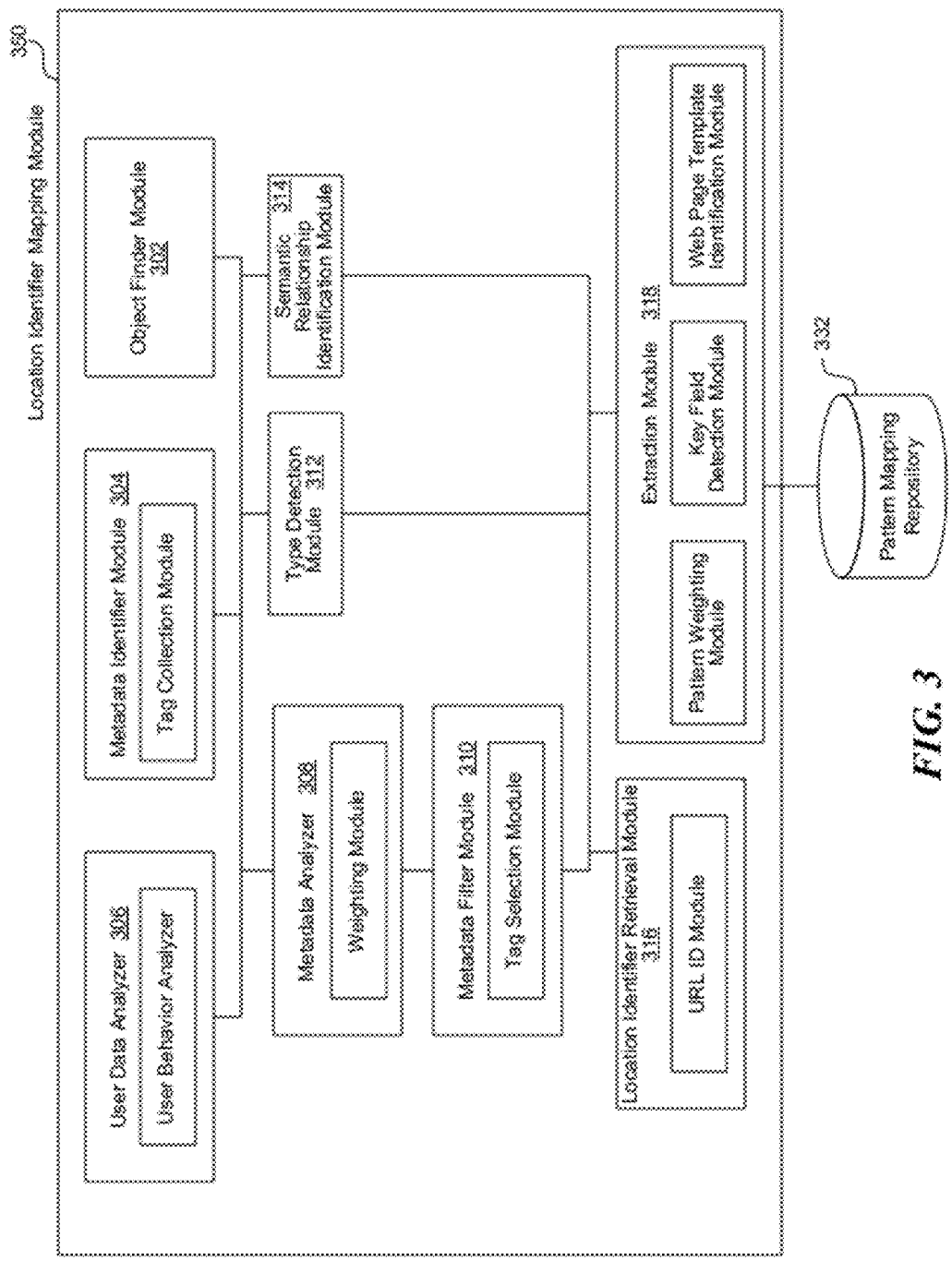
FIG. 3 depicts an example functional block diagram of the location identifier mapping module that uses object metadata to automatically extract an object's location identifier pattern and maps the pattern to a semantic type that corresponds to the object metadata.
Figure 4:
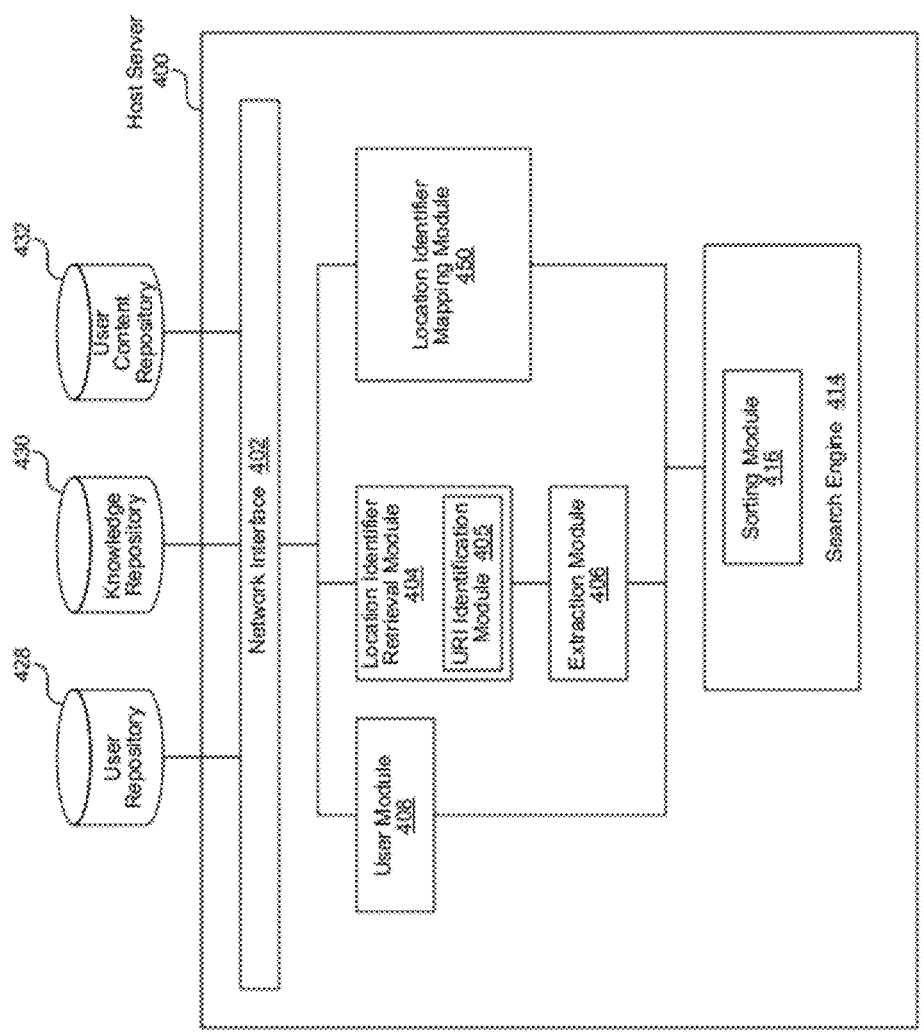
FIG. 4 depicts an example block diagram of the components of a host server that performs search and search optimization of content using location identifier patterns and the associated semantic types.
Figure 5:
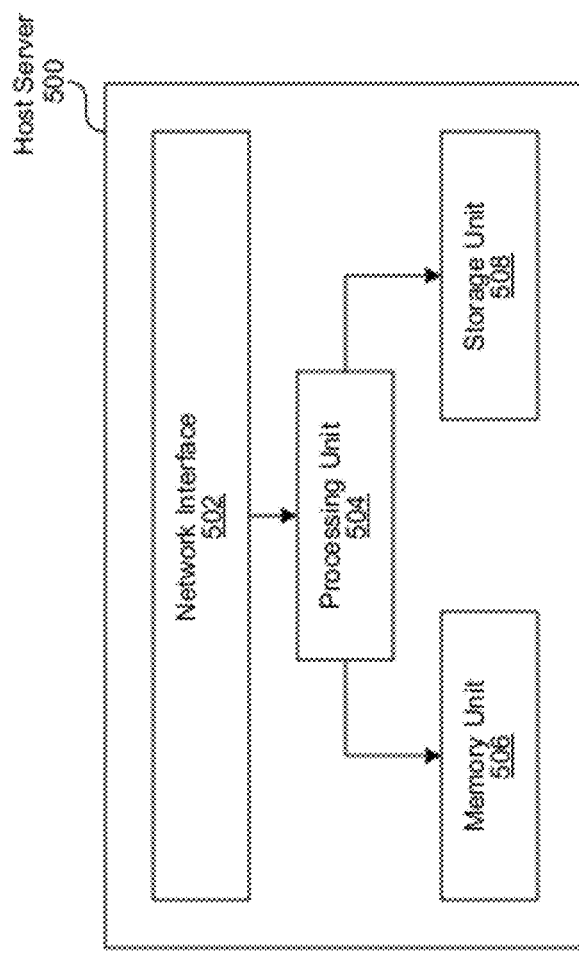
FIG. 5 depicts an example block diagram illustrating the components of a host server that uses object metadata to extract a location identifier pattern and maps the pattern to a semantic type.

Functions and techniques performed by the host server 100 and the components therein are described in detail with further references to the examples of FIG. 3-5.

The client devices 102A-N can be used by users to identify or generate data (metadata) about various objects and their embodied content which can be used for determining semantic types to which location identifier patterns can be matched. The client devices 102A-N are generally operable to provide user access (e.g., visible access, audible access) to content search and the optimized search (e.g., via semantics), for example via user interface 104A-N displayed on the display units.

The network 1013, over which the client devices 102A-N and the host server 100 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102A-N and the host server 100 and may appear as one or more networks to the serviced systems and devices. In one embodiment, communications to and from the client devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but are not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 128, a knowledge repository 130, and/or a user content repository 132. The repositories can store software, descriptive data, images, system information, drivers, and/or any other data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., Concept-Base, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to provide data to be stored in the user repository 128, the knowledge repository 130, and the user content repository 132 and/or can retrieve data stored in the user repository 128, the knowledge repository 130, and/or the user content repository 132. The user repository 128 can store user information, user profile, user tags, user interest, blog entries, tweets, comments on objects and/or content embodied therein, user bookmarks, user preferences, user search preferences, sharing preferences, user-defined semantic types, user-specified attributes of semantic types, user-specified patterns for location identifiers, user reviews of electronic content and sources, device information, hardware information, etc.

The knowledge repository 130 can include, by way of example but not limitation, sets of ontologies, taxonomies and/or folksonomies that can be used by the host server 100 for determining the semantic type or attribute type of electronic content provided in online sources to enhance or optimize search. In addition, the sets of ontologies, taxonomies and/or folksonomies can be used by the host server 100 in identifying semantic types associated with metadata identified from content sources describing objects and/or the content embodied therein. The ontology set can also be used to identify the type of semantic relationship that exists between the objects/embodied content and the identified semantic types.

The ontologies and taxonomies may be user-defined and used on a per-user basis for enhancing search. The ontologies and taxonomies may also be provided by another source or centrally defined and applied globally or to users who have not defined their own ontologies. The knowledge repository 130 in some instances, can also include, dictionaries, thesauruses, and/or encyclopedias, etc. In one embodiment, location identifier patterns and their associated semantic types and/or attributes are stored in the knowledge repository 130.

The user content repository 132 can include, user content including, by way of example but not limitation, user-generated, user-edited, and/or user-provided electronic content (e.g., documents, articles, audio files, video files, text files, images, user dialogue, user chat, etc.). The user content can be aggregated from a host or multiple hosts of online locations where users share information including but not limited to various networking sites (e.g., blogs, forums, social messaging site, social networking site, business networking, knowledge networking, etc.).

Repository 132 can also include user identified, user generated, and/or user supplemented content including content and edits, reviews, and/or comments provided by users used for mapping location identifiers to semantic types and/or further identifying the existing semantic relationship. In some embodiments, the host server 100 can perform search and search optimization using the mapped location identifier patterns not only on web content but also on user-generated, user-provided, and/or user supplemented content contributed through single or multiple content sharing sites, networking sites/utilities.

Figure 2:
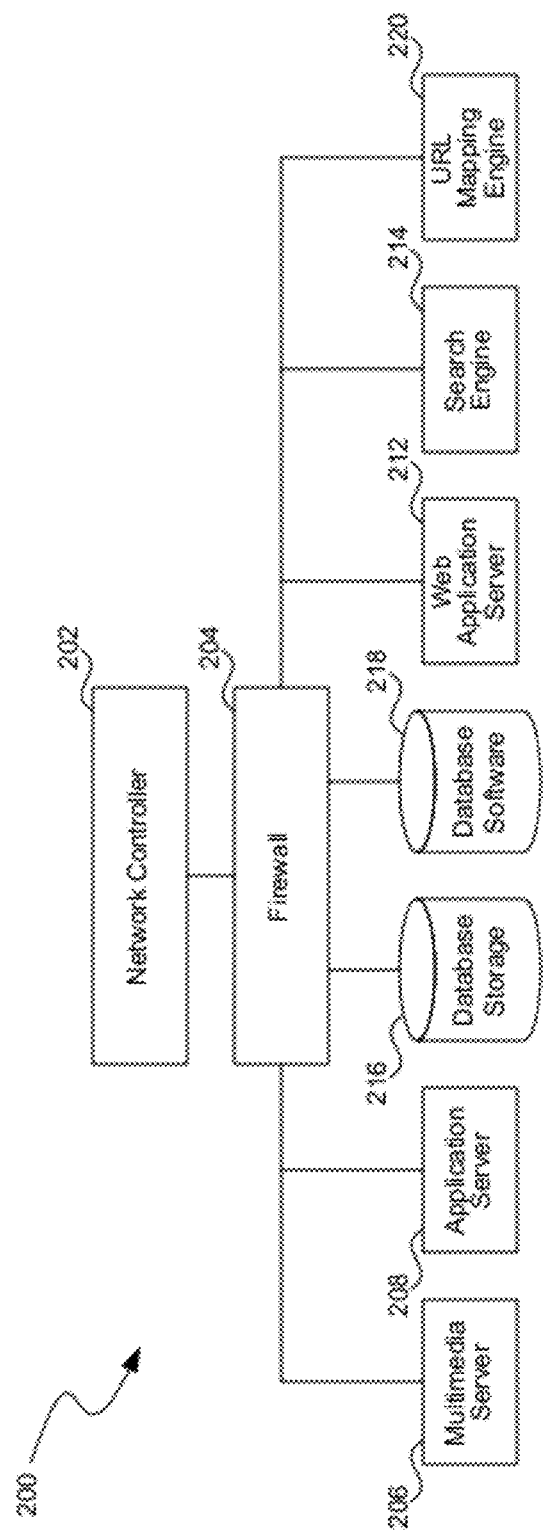
FIG. 2 depicts an example block diagram of the components of a host server that performs automatic mapping of location identifier patterns to semantic types and search/search enhancement using the location identifier pattern.

FIG. 2 depicts an example block diagram of the components of a host server 200 that performs automatic mapping of location identifier patterns to semantic types and search/search enhancement using the location identifier pattern.

In the example of FIG. 2, the host server 200 includes a network controller 202, a firewall 204, a multimedia server 2013, an application server 208, a web application server 212, a search engine 214, a URL mapping engine 220, and a database including a database storage 2113 and database software 218.

In the example of FIG. 2, the network controller 202 can be a networking device that enables the host server 200 to mediate data in a network with an entity that is external to the host server 200, through any known and/or convenient communications protocol supported by the host and the external entity. The network controller 202 can include one or more of a network adaptor card, a wireless network interface card, a router, an access point, a wireless router, a switch, a multilayer switch, a protocol converter, a gateway, a bridge, a bridge router, a hub, a digital media receiver, and/or a repeater.

The firewall 204, can, in some embodiments, govern and/or manage permission to access/proxy data in a computer network, and track varying levels of trust between different machines and/or applications. The firewall 204 can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall 204 may additionally manage and/or have access to an access control list which details permissions including for example, the access and operation rights of an object by an individual, a machine, and/or an application, and the circumstances under which the permission rights stand.

Other network security functions can be performed or included in the functions of the firewall 204, can be, for example, but are not limited to, intrusion-prevention, intrusion detection, next-generation firewall, personal firewall, etc. without deviating from the novel art of this disclosure. In some embodiments, the functionalities of the network controller 202 and the firewall 204 are partially or wholly combined and the functions of which can be implemented in any combination of software and/or hardware, in part or in whole.

In the example of FIG. 2, the host server 200 includes the multimedia server 206 or a combination of multimedia servers to manage images, photographs, animation, video, audio content, graphical content, documents, and/or other types of multimedia data for use in or to supplement search results or semantics-enhanced search results. The multimedia server 206 is any software suitable for delivering messages to facilitate retrieval/transmission of multimedia data among servers to be provided to other components and/or systems of the host server 200, for example while rendering a web page or other types of objects (e.g., electronic content sources) including multimedia content.

In addition, the multimedia server 206 can facilitate transmission/receipt of streaming data such as streaming images, audio, and/or video. The multimedia server 206 can be configured separately or together with the web application server 212, depending on a desired scalability of the host server 200. Examples of graphics file formats that can be managed by the multimedia server 2013 include but are not limited to, ADRG, ADRI, AI, GIF, IMA, GS, JPG, JP2, PNG, PSD, PSP, TIFF, and/or BMP, etc.

The application server 208 can be any combination of software agents and/or hardware modules for providing software applications to end users, external systems and/or devices. For example, the application server 208 provides specialized or generic software applications that provides search or search optimization functionalities which may be semantics-enhanced. The software applications provided by the application server 208 can be automatically uploaded/downloaded on-demand on an as-needed basis or manually at the user's request.

The software applications provided by the application server 208, for example, can allow end users to define semantic types and/or to customize the search experience. The software applications provided by the application server, can, in one embodiment, allow programmers or developers to build semantics-enhanced search engines using pattern recognition of location identifiers (e.g., URLs and/or URIs), for example, using metadata associated with the web pages. The application server 208 can also facilitate interaction and communication with the web application server 212, or with other related applications and/or systems. The application server 208 can in some instances, be wholly or partially functionally integrated with the web application server 212.

The web application server 212 can include any combination of software agents and/or hardware modules for accepting Hypertext Transfer Protocol (HTTP) requests from end users, external systems, and/or external client devices and responding to the request by providing the requestors with web pages, such as HTML documents and objects that can include static and/or dynamic content (e.g., via one or more supported interfaces, such as the Common Gateway Interface (CGI), Simple CGI (SCGI), PHP, JavaServer Pages (JSP), Active Server Pages (ASP), ASP.NET, etc.).

In addition, a secure connection, SSL and/or TLS can be established by the web application server 212. In some embodiments, the web application server 212 renders the user interfaces in the example screenshots of FIG. 13-7A. The user interfaces provided by the web application server 212 to client users/end devices provide the user interface screens 104A-104N for example, to be displayed on client devices 102A-102N in the example of FIG. 1.

In one embodiment, the host server 200 includes a search engine 214 for performing search and search optimization, for example, using patterns in location identifiers of objects such as web pages or other types of content. The objects can include electronic content including but not limited to, electronic documents, digital audio, digital video, images, graphical content, interactive content, etc. The search engine 214 can optimize the search process by enhancing relevancy of search results through, for example, semantics. The search engine can also optimize search by expediting the process to optimize the quantity of sources that can be analyzed in a given time period with limited computing power.

In one embodiment, the host server 200 includes a URL mapping engine 220. The URL mapping engine 220 can be internal to the search engine 214 or external but coupled to the search engine 214 as shown in the example of FIG. 2.

The URL mapping engine 220 automatically or semi-automatically maps URL patterns of web pages to semantic types, for example, using metadata of the web pages collected from various content sources (e.g., online blogs, social networking sites, and/or forums that include the web page or otherwise refer/reference the webpage and its contents).

In some instances, the URL mapping engine 220 further identifies the type(s) of semantic relationships that exist between the web page content and the mapped semantic types. The identified URL patterns and the associated mappings to each of the semantic types can be used for content/web page search, categorization, filtering, and/or sorting (e.g., in a computer database or visually categorized/sorted in a user interface), for example, by the search engine 214 in the host server 200.

In addition, the identified URL patterns and the associated mappings to each of the semantic types can be used by other servers or search engines that are remotely coupled for search enhancement/optimization, or categorization and sorting.

The databases 216, 218 can store software, descriptive data, images, system information, drivers, and/or any other data item utilized by other components of the host server 200 for operation. The databases 216, 218 may be managed by a database management system (DBMS), for example but not limited to, Oracle, DB2, Microsoft Access, Microsoft SQL Server, PostgreSQL, MySQL, FileMaker, etc. The databases 2113, 218 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In the example of FIG. 2, the host server 200 includes components (e.g., a network controller, a firewall, a storage server, an application server, a web application server, a search engine, a URL mapping engine, and/or a database including a database storage and database software, etc.) coupled to one another and each component is illustrated as being individual and distinct.

However, in some embodiments, some or all of the components, and/or the functions represented by each of the components can be combined in any convenient or known manner. Furthermore, the functions represented by the devices can be implemented individually or in any combination thereof, in hardware components, software agents, or a combination of hardware components and software agents.

FIG. 3 depicts an example functional block diagram of the location identifier mapping module 350 that uses object metadata to automatically extract an object's location identifier pattern and maps the pattern to a semantic type that corresponds to the object metadata.

The location identifier mapping module 350 (or "mapping module 350") includes an object finder module 302, a metadata identifier module 304 which may further include a tag collector module, a user data analyzer 306 which may further include a user behavior analyzer, a metadata analyzer 308 which may further include a weighting module, a type detection module 312, a semantic relationship identification module 314, a metadata filter module 310 which may further include a tag selection module, a location identifier retrieval module 316 which may further include a URL extractor, and/or an extraction module 318.

The extraction module 318 can further include a pattern weighting module, a key field detection module, and/or a web page template identifier module. In one embodiment, the location identifier mapping module 350 is coupled to a pattern mapping repository 332, which may be partially internal to, fully internally to, or externally coupled to the mapping module 350.

Additional or less modules can be included without deviating from the novel art of this disclosure. In addition, each module in the example of FIG. 3 can include any number and combination of sub-modules, and systems, implemented with any combination of hardware and/or software modules.

The mapping module 350, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

One embodiment of the mapping module 350 includes an object finder module 302. The object finder module 302 can be any combination of software agents and/or hardware modules able to locate, detect, identify, find, retrieve, and/or search for an object whose location identifier pattern is to be extracted using associated metadata.

An object can be any electronic object stored, shared, distributed, and/or accessed through or using computing devices including but not limited to electronic documents, articles, audio files, video files, multimedia content, interactive content, emails, a web page, a link, an electronic review, a dialogue, a file, a directory, an online message, etc. over a private, public, and/or shared network. The location identifier of the object can be a location identifier in the World Wide Web, a private network, a local network, or local storage on computing element/device including but not limited to a web address (e.g., a URI and/or a URL), file directories, file paths, a network address, a file location, etc.

Figure 7A:
FIG. 7A illustrates an example screenshot showing a content source having a description of a web page and its URL address.
Figure 7B:
FIG. 7B illustrates an example screenshot showing the web page referenced in the content source of the example of FIG. 7A.

The object finder module 302 (or, "finder module 302") is able to detect or find the source object referred to or otherwise referenced by the associated metadata. For example, the finder module 302 can detect a source web page having the article referred to or referenced by various users in a blog or networking site. A web page referenced by a content source is illustrated in the examples of FIG. 7A-B.

The finder module 302 can further identify the location identifier (e.g., URL or URI) of the source web page. In addition, the finder module 302 may also detect and/or locate a source object or other type of content that was tagged with a certain tag by a particular user or a particular group of user. Its location identifier may be retrieved such that the associated metadata (e.g., blog content, user comment, user reviews, user tags, etc.) can be used in automatically extracting the identifier pattern.

One embodiment of the mapping module 350 includes a metadata identifier module 304. The metadata identifier module 304 can be any combination of software agents and/or hardware modules able to locate, search, detect, identify, find, retrieve, collect, analyze, and/or aggregate metadata associated electronic objects and/or their embodied content.

In general, metadata associated with objects/embodied content can include, by way of example but not limitation, data regarding or relating to the object/embodied content from any information sources internal and/or external to the host server (e.g., host server 200 of FIG. 2). In addition, the metadata can also be internal in a sense that it is collected from the object itself or the host of the object (e.g., the same host of a web page). In one embodiment, metadata is collected from content sources hosted by various external servers, the host server (e.g., the host server 200 of FIG. 2), and/or a combination of the above. Each of the content sources from which metadata are collected can include a portion of the object itself or a reference (e.g., a URL or other location identifier) to the object.

In one embodiment, web page metadata is collected from data embedded in XML, RDF, OWL, RDFA, micro formats to obtain information about web pages. Moreover, the metadata can be collected from electronic content including one or more of, bookmarks, bookmarked content, blog articles, tweets, updates, comments, networking sites (e.g., social networking sites, professional networking sites, knowledge networking sites, Digg, Twine, Delicious, Facebook, MySpace, etc.), networking utilities (e.g., Twitter), mobile networking, and/or real time/non-real time messaging (e.g., web-based and/or mobile-device based) utilities, or any content having information about the object (e.g., web page) for which the location identifier pattern is to be mapped. In one embodiment, the metadata is collected from analyzing user behavior. User behavior can include, one or more of, user web-browsing habits, number of visits to website, number of views of web pages, number of bookmarks, number of Tweets regarding a particular site, number of shares with other users, number of mentions, posts, or comments via a networking or messaging utility. In addition, user behavior related to how frequently pages, sites, and/or topics are tagged by users can be used to determine the priority with which semantic information can be extracted. Furthermore, the user-provided tags, extracted entities, and other meta data describing the resources can be analyzed to make inferences about what kind of object is the resource for extraction.

Furthermore, based on the items for which semantic information has been extracted, inferences about resources can be made. For example: 1) A user adds a bookmark for drugstore.com item detail page selling aspirin. The user tags the page with the tags "aspirin". 2) Based on user behavior, it is determined that this page is frequently bookmarked and viewed so it is prioritized as a page to analyze 3) Other resources for which we already have extracted semantic information are analyzed and can determine that this page is similar to other item detail pages from specific sites (e.g., pharmacy.com, buydrugs.com, etc.).

4) Based on 1) and 3) a high probability can be assigned to this item detail page being of type "Pharmaceutical product". The template can then be checked for the item detail page to use heuristics to match the core ontological properties for "pharmaceutical product" to the core template properties that are identified in the item detail page. Based on this analysis, it can be determined with a relatively high probability this is indeed a "pharmaceutical product" with properties like "ingredients", "price", "dosage", etc.

The metadata can include user-generated, user-identified, and/or user-supplemented metadata. In general, the user-generated or user-identified metadata can include, for example, one or more tags, user reviews, user annotation, user comments, user ratings, and/or any other form of user input about the object or the embodied content.

In one embodiment, the metadata identifier module 304 identifies tags associated with an object or the embodied content. For example, the metadata identifier module 304 can identify a set of tags that are associated with a web page. The tags can be identified from the web page itself where user comments or user-identified/user-generated tags can be provided. In addition, the tags can be identified from any number of other content sources that refer or reference the web page. The identified tags can be used to extract the pattern from the URL/URI of the web page and further used to map the extracted pattern to one or more semantic types. The tags may or may not be further analyzed and filtered prior to use in pattern extraction and semantic mapping.

The metadata identifier module 304 may also identify tags that are associated with an entire website hosted by a single web server. In this instance, each of the tags can be individually associated with various web pages (e.g., by the object finder 302) in the website before use in pattern extraction and/or semantic mapping to semantic types, as illustrated diagrammatically in the example of FIG. 14. In some embodiments, the tag collection module collects the tags from various sources including external sources or the object itself.

One embodiment of the mapping module 350 includes a user data analyzer 306. The user data analyzer 306 can be any combination of software agents and/or hardware modules able to detect, retrieve, identify, and/or analyze user data (e.g., user metadata) provided by users related to an object and/or its embodied content.

The user data analyzer 306 can obtain user-identified, user-generated, and/or user supplemented metadata, for example, from communicating with the metadata identifier module 304. In general, the user data analyzer 306 analyzes such user contributed metadata based on an identity of the user who provided or otherwise contributed to the metadata. For example, the contributing user may have a known interest or known expertise in a particular topic area relevant to the contributed metadata. In this instance, such metadata can be indicated as being more trustworthy for use in pattern extraction and/or semantic mapping of the extracted pattern.

In general, the trustworthiness of user-identified and/or user generated metadata is associated with the trustworthiness of the user who contributed to the metadata. The trustworthiness of the user can be determined from various internal or external sources including but not limited to information gleaned from, the user's profile, the user's browsing habits, the user's tagging/bookmarking habits, reviews of the user's input by other users, quality of the user's comments, reviews, annotations, etc.

In some instances, user trustworthiness can be quantified by a user rating which can subsequently be associated with the weighing of metadata identified or generated by the user. For example, the weight for a tag specified by a user can be assigned based on the rating of the user. In addition, the trustworthiness of the extracted pattern and semantic mapping can be determined (e.g., qualitatively or quantitatively) or rated based on the associated weight value of the tag used to extract the pattern.

The user data analyzer 306 determined the user rating, based on, one or more of several factors including but not limited to, an interest of the user, social endorsement of the user by other users, expertise of the user, and/or reliability of the user. Moreover, the rating of the user can be determined based on similarity of tags identified by the user compared to tags identified by other users for a same set of content.

In some embodiments, user rating can be determined from analyzing user behavior (e.g., via the user behavior analyzer). The user behavior that can be tracked and subsequently analyzed include for example, number of user visits (to a site or web page), number of views of an object, number of bookmarks (e.g., of web pages in the web site), number of shares with other users, and/or number of updates, mentions, and/or posts via a social networking utility.

For example, a user rating may be higher for a specific web site where he/she frequently visits, comments, or blogs about compared to other sites. The user's rating may also be higher for a specific domain of knowledge as determined by how frequently the user browses, comments on, or otherwise interacts with sites, pages, or objects having content of or relate to the specific domain of knowledge.

One embodiment of the mapping module 350 includes a metadata analyzer 308. The metadata analyzer 308 can be any combination of software agents and/or hardware modules able to quantitatively or qualitatively analyze the set of metadata associated with an object.

The metadata analyzer 308 analyzes the set of metadata associated with the object to determine their usability in extracting a pattern from the object's location identifier and/or mapping the pattern to a semantic type. Specifically, the object may be associated with a large pool of metadata including various book marks, chat dialogues, messages, blog entries, blog articles, user comments, reviews, tags, tweets, and/or any other content sources that contain information about the object, etc.

The metadata analyzer 308 can analyze a pool of metadata associated with an object to extract the set that is most reliable or relevant for use in location identifier pattern extraction and its semantic mapping. In one embodiment, the metadata analyzer 308 identifies the set of common/similar metadata from the pool for use in pattern extraction and/or semantic mapping. A few sets of comment/similar metadata can be identified for a given object (e.g., web site identified by a URL/URI).

In one embodiment, the metadata analyzer 308 assigns weights to each metadata to indicate a degree of usability in pattern extraction and/or semantic mapping. For example, the metadata analyzer 308 can assign weights to various tags associated with an object or web page based on the total number of times or percentage of times (e.g., statistical metrics) that the object was tagged with a particular weight. In addition, the weights can be assigned based on the total number of different users that have tagged the object or web page with a particular tag.

Note that the weights of each metadata (or tags) can also be assigned and/or modified/refined based on the user that submitted or otherwise contributed to (e.g., identified, generated and/or supplemented) the metadata according to various parameters specified in detail in association with the description of the user data analyzer 306 (e.g., user metrics). Thus, statistical metrics and user metrics can be used in conjunction or independently to rate/rank a pool of metadata associated with an object. In general, the pattern extracted from the location identifier has a trustworthiness rating that corresponds to (e.g., proportional to) the associated weighting of the metadata or tag.

One embodiment of the mapping module 350 includes a metadata filter module 310. The metadata filter module 310 can be any combination of software agents and/or hardware modules able to select metadata from a pool of metadata associated with an object for use in pattern extraction of its location identifier and semantic mapping.

For example, the metadata filter module 310 communicates with the metadata analyzer 308 and obtains information about the set of metadata and/or the set of tags associated with an object or web page. This information can include quantitative metrics such as weights of the various metadata or tags. In one embodiment, the metadata filer module 310 selects a subset of metadata (e.g., a subset of multiple tags) for use in identifying a set of semantic types with which the object or the content embodied therein has a semantic relationship. This selection can be performed based on weights assigned to various metadata or tags.

Additionally, the selection can be made based on the usage frequency or the popularity of a particular metadata. For example, the particular metadata can be selected from the pool of metadata when the usage frequency of a particular tag exceeds a value (e.g., a threshold value). The usage frequency of the particular metadata or tag can be represented by a number of times or a percentage of times the object or the content embodied therein have been associated with a particular metadata or tag.

For example, if a web page or object is tagged with a particular tag 'T' more than a sum of x times (or more than y % of the time), the tag 'T' can be selected for use in extracting a pattern from the URL of the web page and for semantic mapping of the pattern. Note that in general, the tag 'T' of the web page can be tagged by users from various web resources including various web sites including bookmarks, blogs, networking sites or other networking utilities.

In general, for a given web page or other electronic object, the more times it has been tagged by users with the same tag, the more relevant that tag is for that given page or object. Thus, the usage frequency of a tag that is associated with a web page can include the number of times or the percentage of times that web page has been tagged with the same tag by different users. In one embodiment, the metadata filter module 310 selects a tag from a set of tags for use in determining the semantic type to which the pattern extracted from the URL of a web page corresponds, for example, by the tag selection module.

Therefore, if a web page includes different tags identified by different users, the common set of tags can be selected for use in pattern extraction and semantic mapping. For example, if user 1 bookmarks a page 'P' and tags it with tag 'T', user 2 bookmarks page 'P' and tags it with tags 'S', 'T', and 'R', user 3 also bookmarks page 'P' and tags it with tags 'S', 'T', and 'Q', then tag 'T' could be selected for use in automatic pattern extraction and/or semantic mapping, as shown diagrammatically in the example of FIG. 13. Tag 'S' may also be selected for use in the automated analysis.

In addition to using popularity of metadata for filtering, metadata or tags can be selected based on correspondence to the object or its content. For example, the filter module 310 can select the metadata if the location identifier of the object (e.g., initial content source) includes a segment having the metadata (e.g., or tag). In addition, the filter module 310 can select the tag if the object and/or its embodied content comprise text that includes the metadata or tag itself. Similarly, the filter module 310 can select the tag if the XHTML or HTML of the content source includes text that corresponds to the metadata or tag.

The filter module 310 may further refine the filtering process by selecting the metadata or tag that occurs more frequently in the text or (X)HTML of the content source. Note that the popularity method can be used in conjunction with or independent of the content correlation scheme by the filter module 310 in performing the selection of the metadata/tag for use in pattern extraction/semantic mapping.

One embodiment of the mapping module 350 includes a type detection module 312 and a semantic relationship identification module 314 ("relationship identification module 314"). The type detection module 312 can be any combination of software agents and/or hardware modules able to determine a semantic type with which metadata or a tag corresponds. The relationship identification module 314 can be any combination of software agents and/or hardware modules able to determine the type of semantic relationship that exists between the object content and the identified semantic type.

Generally, the type detection module 312 can identify the semantic type for metadata or the tag selected (e.g., by the filter module 310) for use in extracting a pattern of an object's location identifier and/or for semantically mapping the pattern to the identified semantic type. Thus, the content embodied in the object can be identified as having a semantic relationship with the semantic type identified as being corresponding to the metadata or tag. In addition, the pattern extracted from the object's location identifier using the metadata or tag can be used in searching for other location identifiers having the same or similarly matching pattern. The other objects associated with the other location identifiers with the matching pattern can also be identified as having content having the semantic relationship with the identified semantic type.

Note that semantic types of content in objects (e.g., web pages) can be partially or fully automatically determined by the system or specified by an end user. For example, the semantic type can be automatically determined through topic detection, natural language processing (NLP), speech processing, latent semantics indexing, etc. Semantic types can also be defined by the end user through tagging or annotating the object (e.g., web page) through a user interface in which the object is provided for access.

Note further that each semantic type can be associated with one or more attributes that may be user-defined, automatically determined by the system, or a combination of both. Attributes of semantic types may be determined through a predefined ontology or user defined ontology. For example, a semantic type of 'Restaurant' can include the attributes 'Location', 'Price Range', 'Cuisine', etc. Some of these attributes may be system defined and some may be user-specified. Attributes defined by users may be provided to other users for reference and/or for rating, for example, via a user interface.

In one embodiment, the type detection module 312 detects the semantic type by mapping the metadata/tag to an ontology or taxonomy set. Similarly, the identification module 314 can also determine the type of semantic relationship by mapping the metadata/tag to an ontology or taxonomy set. If the ontological class of a content source (e.g., a web page) is known (e.g., that a given webpage is about restaurants), NLP can be used to map the tags/metatags in the page with an ontology for restaurants. Similarly, on a web page for prescription drugs, if there is a node in the XML template of the web page that maps to "dosage", then node can be mapped to the dosage property of the ontology for prescription drugs.

One embodiment of the mapping module 350 includes a location identifier retrieval module 316 ("retrieval module 316"). The retrieval module 316 can be any combination of software agents and/or hardware modules able to detect, identify, and/or retrieve a location identifier of an object having electronic content.

For a web page, the retrieval module 316 can identify a location identifier (e.g., URI or URL) of the web page (e.g., by the URI identification module of the location identifier retrieval module 316). In one embodiment, the retrieval module 316 identifies location identifiers of web pages in a domain from the domain's sitemap. In other embodiments, URIs and URLs can be manually identified or seeded from other resources. For example, a web crawler (e.g., a web crawl corpus such as Build Your Own Search Service (BOSS) platform) can be used to filter domains. In addition, the retrieval module 316 performs a manual crawl of the site can be performed to extract URLs and/or URIs in domains. Other known and/or convenient methods can also be used to extract location identifiers. For other types of objects, the associated types of location identifiers can be identified and retrieved by the retrieval module 316.

One embodiment of the mapping module 350 includes an extraction module 318. The extraction module 318 can be any combination of software agents and/or hardware modules able to extract a pattern from a location identifier of an object.

The extraction module 318 can extract the pattern from the object's location identifier using its associated metadata such as tags. For example, the extraction module 318 can extract a pattern from the URI or URL of a web page object. In general, the extracted pattern corresponds to the semantic type with which content embodied on the object or web page has a semantic relationship. The extracted pattern can subsequently be used, for example, by the search engine 214 of the host server 200 in the example of FIG. 2 to identify other objects (e.g., web pages) having the semantic relationship to the same semantic type.

The pattern of the location identifier once identified, can be stored in a computer-readable storage medium (e.g., in a computer database stored in hardware storage) for subsequent usage when determining the semantic type of content in an object (e.g., web page, off-line document, chat dialogue, etc.) to enhance the relevancy of search results and/or to identify and generate search results having content of a semantic relationship to the semantic type.

In one embodiment, the extraction module 318, based on the associated metadata (e.g., tag) of the content in the associated object or web page, automatically parses the location identifier to extract the pattern based on the semantic type. For example, the location identifier may include one or more portions with words that correspond to the semantic type in literal translation (e.g., in meaning). These portions may be defined in the pattern of the location identifier as the semantic type segment. For example, a semantic type of "car reviews" may correspond to a web page having a portion with the term "car" or "car/review". The term "car" or "car/review" may then be automatically identified and used in the pattern for refining existing search results or identifying search results pertaining to "car reviews".

Pattern extraction is typically dynamic depending on the location identifier and the associated semantic type and/or attributes of the content of the object or of the various fields/segments in the pattern. In one embodiment, dynamic pattern extraction is automated using one or more algorithms. For example, each URL can be broken up into fragments (e.g., based on path segments and/or using the query parameters). The fragmented portions can be combined using various permutations. The permutations of the various combinations can then be filtered or selected based on various criteria. For example, the permutations with lesser number of segments that also match the URIs/URLs (location identifiers) of interest can be identified.

For URL/URI of a web page object, the extraction module 318 extracts a pattern by identifying a key field from the URL segments in the URL. The extraction module 318 can identify the key field in the URL by comparing each URL segment of two URLs in a web site and their corresponding values. In one embodiment, the key field is identified by comparing URLs of web pages that share the same or similar template to analyze the substrings within the URLs (e.g., using string comparison techniques). There may be several different substrings that change, e.g. zip code, affiliate ID, and the actual unique (possibly compound) id that uniquely identifies the underlying resource.

Thus, using the key field, a semantic type with which content embodied in a web page associated with the URL has a first type of semantic relationship, can be identified. In one embodiment, the key field is identified by the key field detection module. The extracted pattern can be stored in a database embodied in a machine-readable storage medium as being mapped to the first semantic type. For example, the content can be determined as having a video format (e.g., having a semantic relationship "has-format" with the semantic type "video").

In one embodiment, the extraction module 318 determines a template structure of the web page based on the comparison of the two URLs. For example, the template can be represented by a document object model (DOM) structure where the tree nodes representing HTML elements of the web pages can be compared. Using the comparison, commonalities and differences in the templates can be identified. In one embodiment, the semantic type can also be identified from the layout of the template structure. Note that in some instances, the key field determines the layout of the template structure. The template structure may be identified by the web page template module.

In addition, the extraction module 318 may identify a second semantic type from the identified key field, another key field, and/or layout of the template structure such that the content in the web page may have a second type of semantic relationship with the second semantic type. For example, the same web page having content of a video format can be also determined as having an intended audience of children (e.g., having a second semantic relationship "has-audience" with the semantic type "children").

Moreover, in addition to using the key field, the value in the key field of the URL segment can be used to identify other semantic types with which the content has the same semantic relationship. For example, using the extracted pattern, a value can be extracted from the key field of a second URL. Based on the value in the key field in the second URL, yet another semantic type with which content embodied in the web page that corresponds to the second URL has the same first type of semantic relationship can be detected. For example, the extracted pattern can be used to determine that the second URL has audio content (e.g., having the same first semantic relationship "has-format" with another semantic type "audio").

In one embodiment, the extraction module 318 weighs the extracted pattern. In general, a pattern extracted from the location identifier has a trustworthiness rating that corresponds to the associated weighting of the tag or metadata used for the pattern extraction and/or semantic mapping. The weighting of the tag or other types of metadata generally corresponds to the popularity of the tag or metadata among users, reviewers, and/or moderators. In addition, the weighting of the tag/metadata may also generally correspond with its correlation to the object and its embodied content. The extraction module 318 can communicate with the metadata analyzer 308 and/or the metadata filter module 310 to determine the rating/weighting of the metadata or tag.

Additional or less modules can be included without deviating from the novel art of this disclosure. In addition, each module in the example of FIG. 3 can include any number and combination of sub-modules, and systems, implemented with any combination of hardware and/or software modules.

The mapping module 350, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

FIG. 4 depicts an example block diagram of the components of a host server 400 that performs search and search optimization of content using location identifier patterns and the associated semantic types.

The host server 400 includes a network interface 402, a location identifier retrieval module 404, an extraction module 406, a user module 408, a location identifier mapping module 450, and/or a search engine 414. In one embodiment, the location identifier retrieval module includes a URI identification module 305. The search engine 414 may further include a sorting module.

In one embodiment, the host server 400 is coupled to a user repository 428, a knowledge repository 430, and/or a user content repository 432. The user repository 428, knowledge repository 430, and the user content repository 432 have been described with further reference to the example of FIG. 1.

Additional or less modules can be included without deviating from the novel art of this disclosure. In addition, each module in the example of FIG. 4 can include any number and combination of sub-modules, and systems, implemented with any combination of hardware and/or software modules.

The host server 400, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 4, the network interface 402 can be a networking device that enables the host server 400 to mediate data in a network with an entity that is external to the host server, through any known and/or convenient communications protocol supported by the host and the external entity. The network interface 402 can include one or more of a network adaptor card, a wireless network interface card, a router, an access point, a wireless router, a switch, a multi-layer switch, a protocol converter, a gateway, a bridge, a bridge router, a hub, a digital media receiver, and/or a repeater.

One embodiment of the host server 400 includes a location identifier mapping module 450 ("mapping module 450"). The location identifier mapping module 450 can be any combination of software agents and/or hardware modules able to perform automatic mapping of a location identifier pattern to a semantic type. The techniques and functions performed by the mapping module 450 are described with further reference to the mapping module 350 in the example of FIG. 3. The location identifier mapping module 450 includes all or any portion of the modules and performs all or any portion the associated techniques described for the mapping module 350 of FIG. 3. In some embodiments, the mapping module 450 is fully or partially internal to a search engine (e.g., the search engine 414).

One embodiment of the host server 400 includes a location identifier retrieval module 404. The location identifier retrieval module 404 can be any combination of software agents and/or hardware modules able to detect, identify, and/or retrieve a location identifier of an object having electronic content. The URL identification module 405 can retrieve URL and/or URL of a web page or website. In general, the retrieval module 404 performs similar functions and features as the retrieval module 316 in the example of FIG. 3. The retrieval module 404 includes all or any portion of the modules and performs all or any portion the associated techniques described for the retrieval module 316 of FIG. 3 and may be wholly or partially internal to the mapping module 450.

One embodiment of the host server 400 includes an extraction module 406. The extraction module 406 can be any combination of software agents and/or hardware modules able to extract a pattern from a location identifier of an object. The extraction module 406 includes all or any portion of the modules and performs all or any portion the associated techniques described for the extraction module 318 of FIG. 3 and may be wholly or partially internal to the mapping module 450.

In addition, the extraction module 406 extracts the pattern from the location identifier via user input. In some instances, the semantic types are user-specified or user defined and can be redefined or re-configured. Thus, the pattern for the user-specified semantic type can be automatically determined/extracted when the object (webpage) is identified by the user as having content of or related to the user-specified semantic type. Alternatively, the pattern for the user-specified semantic type may also be manually specified or modified by the user.

Note that multiple patterns can be determined for a single semantic type based on identification of multiple web pages as having content of or relating to the semantic type by multiple users. All or a portion of these patterns can be subsequently used for identifying content of or relating to the semantic type. In some embodiments, the multiple patterns defined for a single semantic type can be ranked based on the number of users that have identified the associated content as having content of or relating to the semantic type. The rankings can be used in determining which patterns are subsequently used by default for search or search enhancement or for users who have not defined customized vocabulary of semantic types and/or attributes.

In one embodiment, the pattern corresponding to the semantic type also corresponds to an attribute of the semantic type of the content in the object (web page). For example, the pattern may correspond to the semantic type of 'car models' but also correspond to the attribute 'car reviews' of 'car models'. In general, patterns extracted by the extraction module 406 include a wildcard segment. The pattern may also include a domain name segment, a semantic type segment, and/or an attributes segment.

In one embodiment, the extraction module 406 extracts a sub-pattern from the location identifier of the object (web page). The sub-pattern can correspond to attributes or other properties of the semantic type. For example, if the pattern "www.reviews.com/cars/*" (where "*" represents the wildcard segment of the pattern) corresponds to the semantic type of "cars", the sub-pattern of "www.reviews.com/cars/ reviews/*" can be extracted by the extraction module 406 to correspond to the attribute of "car reviews" and stored for subsequent use, for example, by the search engine 414 in optimizing or performing search for content related to "car reviews". Multiple sub-patterns, each corresponding to one of multiple attributes of the semantic type can be extracted by the extraction module 406.

One embodiment of the host server 400 further includes a search engine 414. The search engine 414 can be any combination of software agents and/or hardware modules able to search, locate, identify, detect, objects having electronic content that satisfy one or more search criteria contained in a search query.

The search engine 414 can identify a set of search results in response to a search query via keyword search, query expansion, indexing content, meta-search, rankings, vertical search (e.g., domain-specific search), semantic search, or any combination of the above, etc. In one embodiment, the search engine 414 performs search and/or optimized search using patterns identified from location identifiers (URLs or URIs) of objects (web pages) having content with mapped semantic types and semantic relationships. The pattern-facilitated search method and search optimization technique can be used in lieu of and/or in conjunction with any of the above listed search processes at any stage of the search process.

Note that the search engine 414 can identify search results from web pages or other types of electronic content from various sources. The sources can include objects distributed over the Internet (World Wide Web), objects stored locally, objects shared over a local or private network, etc. The sources can also include user content locally provided or shared by a network of users over networking site or multiple networking sites (e.g., a knowledge networking site, a semantics-enabled knowledge networking site, a social network site, a professional networking site, etc.). The user content that can be searched and analyzed by the search engine 414 and used to identify search results includes user-added content, user-generated content, and/or user supplemented content.

In one embodiment, the search engine 414 detects a set of location identifiers that have a pattern that matches a specified pattern. The specified pattern generally corresponds to a semantic type and/or a semantic relationship and can be stored in a computer-readable storage medium in the host server 300 retrieved for use. The search engine 314 can then identify a set of search results as having content related to the semantic type using the specified pattern. For example, in response to receiving a search query via a user interface (e.g., a search user interface), the search query can be mapped into the pattern and a search for other location identifiers having a matching pattern is performed. The set of search results generally includes objects (e.g., web pages) associated with the location identifiers (e.g., URL and/or URL) having the specified pattern.

In one embodiment, the extracted patterns and/or associated mappings are determined (e.g., automatically or semi-automatically) by the mapping module 450. The search engine 414 can retrieve the extracted patterns and/or associated mappings from a database (e.g., the pattern mapping repository 332 in the example of FIG. 3) and use the patterns to search for other location identifiers also having a pattern matching the pattern. Using an extracted pattern with a mapped semantic type, the search engine 414 can locate other objects or other objects having embodied content, that have a semantic relationship to the semantic type.

The search engine 414 can use, for example, a URI/URL pattern to locate web pages with generally the same or similar pattern and use these web pages to generate a set of search results without using other search methods. The search engine 414 can also enhance the search relevancy by using URI/URL patterns to categorize search results (e.g., can include search results identified from one or more other search methods such as keyword or indexed content search) as having content of or relating to a particular semantic type associated with a particular URI pattern, for example.

The search engine 414, using a stored pattern on a computer-readable storage medium in the host server 300, performs pattern recognition on multiple location identifiers and detects matching location identifiers having generally a same or similar pattern as the stored pattern.

The search engine 414, using the matching location identifiers (from both the same or different domain names), can identify a set of type determined objects (e.g., type-determined web pages) having the matching location identifiers (e.g., URIs or URLs) and can generate a set of search results from the set of type-determined web pages. Note that each of the type-determined objects or web pages will typically have content of or related to the semantic type associated with the stored pattern used in identifying the matching location identifiers.

The search engine 414 can also use the matching location identifiers to refine an existing set of search results to identify objects having the content of or related to the specific semantic type that corresponds to the stored pattern. For example, the search engine 414 can semantically categorize the existing set of search results and identifying a subset of which as having content related to the semantic type or one or more attributes of a semantic type in which the user is interested.

In one embodiment, the search engine 414, using the extracted patterns and/or mapped semantic types, visually sorts or filters the object in a search results page according to the semantic relationship with the semantic type. As illustrated in the example screenshot of FIG. 13, the user can refine or filter the view by various semantic types of tag facets (e.g., type of items, related tags, related people, places, organizations, etc.). In one embodiment, the sorting/filtering is performed by the sorting module.

One embodiment of the host server 400 includes a user module 408. The user module 408 can be any combination of software agents and/or hardware modules able to receive, manage, process, track, record, and/or analyze, user information, user profile data, user behavior, user content, user generated/identified metadata, user preferences, etc.

The user module 408 can manage user information such as user profile information including but not limited to, demographic information, interests, level of education, profession, hobbies, etc. User information can be static or dynamically updated by the system. For example, the user module 408 can track and/or analyze user behavior on a periodic or continuous basis and use the information for analyzing and/or rating user metadata.

For example, the user module 408 can track the user's tagging/bookmarking habits, reviews of the user's input by other users, quality of the user's comments, reviews, annotations, etc. In addition, the user module 408 can track browsing behavior such as the frequency with which a user views a particular page or visits a particular site, how active a user is on a site/page (e.g., via browsing, commenting, and/or otherwise interacting with pages or objects), the user's postings on a networking or messaging utility, the user's updates on a networking/messaging utility, the user's shared items with other users, etc.

The user module 408 can also track, record, and/or store the rating of the user's comments/reviews by other users. In one embodiment, the user module 408 provides user information to the user data analyzer (e.g., user data analyzer 306 of FIG. 3) for use in analyzing/rating user metadata. The user module 408 can store and update such static and dynamic user information in the user repository 428.

In some embodiments, the user module 408 can track different semantic types and/or associated attributes defined by different users (e.g., a first set of semantic types defined by a first user and a second set of semantic types defined by a second user, etc.). By tracking different semantic types/attributes defined by different users, user-customized search results can be optionally provided when content search performed for different users are based on their individually specified semantic types and attributes. In some embodiments, the various semantic types/attributes defined by individual users can be provided to other users as well.

FIG. 5 depicts an example block diagram illustrating the components of a host server 500 that uses object metadata to extract a location identifier pattern and maps the pattern to a semantic type.

In one embodiment, host server 500 includes a network interface 502, a processing unit 504, a memory unit 5013, and/or a storage unit 508. Additional or less units or modules may be included. One example of a suitable network interface 502 has been described in the example of FIG. 4.

One embodiment the host server 500 further includes a processing unit 504. The data received from the network interface 502 can be input to the processing unit 504. The data that is received can include search queries, content from various content sources or a user content repository. The processing unit 504 can include one or more processors, CPUs, microcontrollers, FPGAs, ASICs, DSPs, or any combination of the above. Data that is input to the host server 500 can be processed by the processing unit 504 and output to a display and/or output via a wired or wireless connection to an external device, such as a mobile phone, a portable device, a host or server computer by way of a communications component.

One embodiment of the host server 500 further includes a memory unit 506 and a storage unit 508. The memory unit 506 and a storage unit 508 are, in some embodiments, coupled to the processing unit 504. The memory unit can include volatile and/or non-volatile memory. In performing search and search optimization (e.g., semantics-enhanced search optimization), the processing unit 504 may perform one or more processes related to pattern extraction in a location identifier of a source of content and processes related to pattern recognition in identifying objects (e.g., web pages or other types of electronic source) having content of or related to specific semantic types or attributes based on the specific search query.

In some embodiments, any portion of or all of the functions described of the various example modules in the location identifier mapping module 350 of the example of FIG. 3 can be performed by the processing unit 504. In particular, with reference to the location identifier mapping module 350 illustrated in FIG. 3, the functions and techniques executed by the object finder module, the metadata identifier module, the user data analyzer, the metadata analyzer, the type detection module, the semantic relationship identification module, the location identifier retrieval module, and/or the extraction module can be performed via any of the combinations of modules in the control subsystem that are not illustrated, including, but not limited to, the processing unit 504 and/or the memory unit 506.

Moreover, in some embodiments, any portion of or all of the functions described of the various example modules in the host server 400 of the example of FIG. 4 can also be performed by the processing unit 504. In particular, with reference to the host server 400 illustrated in FIG. 4, the functions and techniques executed by the user module, location identifier retrieval module, the extraction module, the location identifier mapping module, and/or the search engine can be performed via any of the combinations of modules in the control subsystem that are not illustrated, including, but not limited to, the processing unit 504 and/or the memory unit 5013.

Figure 6:
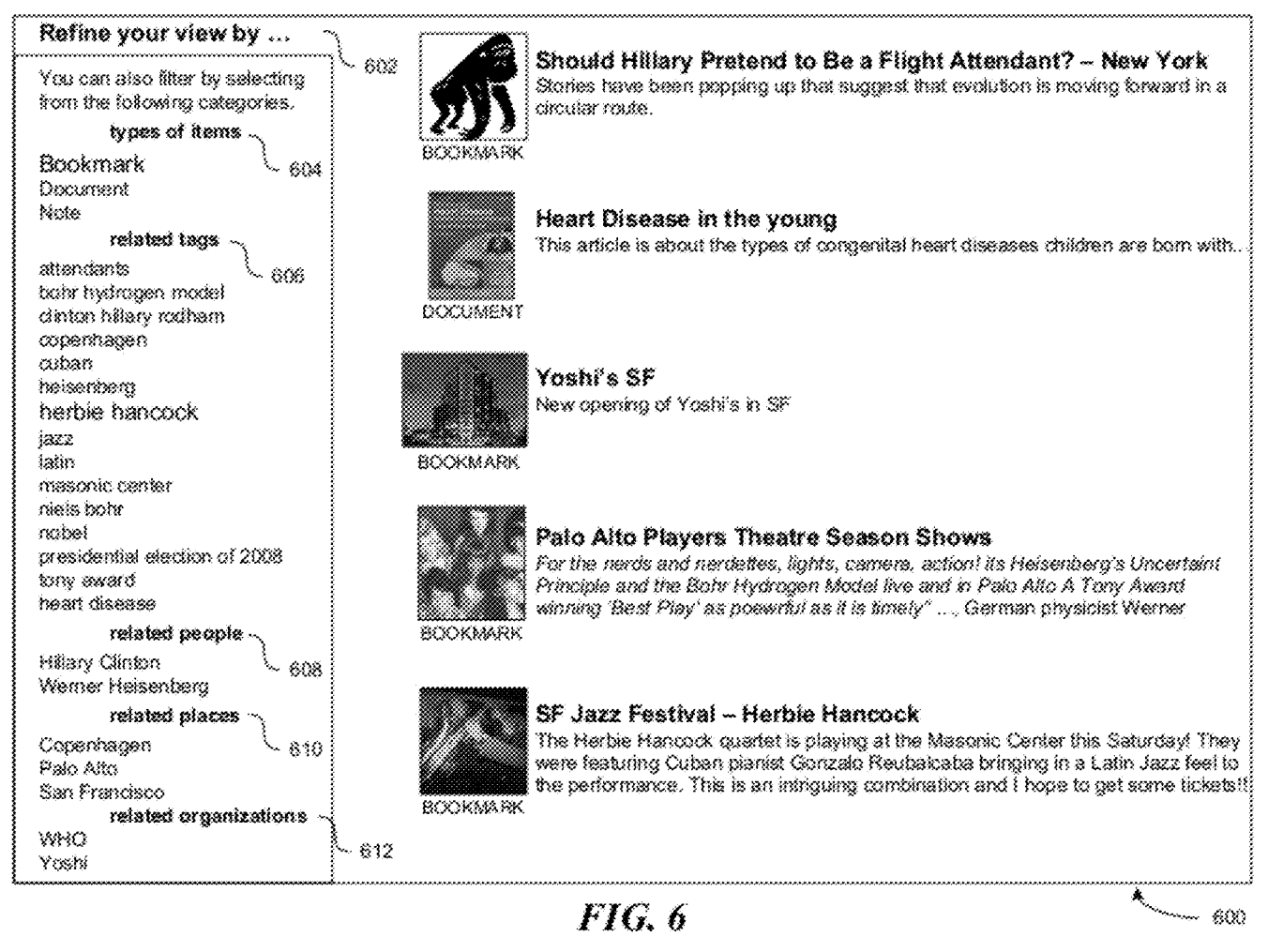

FIG. 6 illustrates an example screenshot 600 showing tags and/or semantic types by which the search results can be visually sorted and/or filtered when presented to a user.

The panel 602 illustrates an example listing of semantic types and/or tag facets by which users can use to filter a view of search results. For example, the user can select to view a particular type of item 604 including by way of example but not limitation, a bookmark, a document, and/or a note. The user can also select to view results based on related tags 606, related people 608, related places 610, and/or related organizations 612.

FIG. 7A illustrates an example screenshot 700 showing a content source having a description 708 of a web page and its URL address 702.

Metadata that is relevant to contents of the web page can be identified from the content source. The content source can generally be external, internal, or a combination thereof. In the example of FIG. 7A, the content source is external to the referenced web page (e.g., the content source is hosted on a different website than the referenced object). In the content source shown in the example of FIG. 7A, metadata can be extracted from the description portion 708 of the content source. In addition, the content source includes tags 704 (e.g., system detected, user identified, and/or user generated tags) associated with the content in the web page. The tags 704 can be used in identifying one or more semantic types with which the web page content has a semantic relationship. The content source may also allow users or readers to submit comments (e.g., via comment box 706).

The identified metadata set (e.g., metadata from the description 708, public comments 706, and/or tags 704) of the web page referenced by the URL 702 can be used in extracting a pattern from the URL 702. Furthermore, the extracted pattern can be associated with one or more semantic types determined based on the extracted metadata set. FIG. 7B illustrates an example screenshot 750 showing the web page referenced in the content source of the example of FIG. 7A.

Figure 8A:
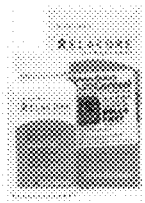
FIG. 8A illustrates an example screenshot of a web page template which can be used to identify a semantic type with which the web page content has a semantic relationship.
Figure 8B:
FIG. 8B illustrates an example screenshot of another web page template which can be used to identify a semantic type with which the web page content has a semantic relationship.

FIG. 8A illustrates an example screenshot 800 of a web page template which can be used to identify a semantic type 804 with which the web page content has a semantic relationship. FIG. 8B illustrates an example screenshot 850 of another web page template which can be used to identify a semantic type with which the web page content has a semantic relationship.

The URL 802 associated with first web page shown in example 800 can be retrieved and compared with the URL 852 of the second web page in the example screenshot 850. By comparing the URL segments in the URL 802 with the segments in the URL 852 and the corresponding values in each field, a first pattern can be extracted by identifying a key field from the URL segments in the URL 802 and/or the URL 852. For example, by comparing URL 802 and 852, the two fields <pid> and <catid> can be detected as being the key fields used in generating the templates.

Using the key field, a semantic type with which content embodied in the first or second web page has a semantic relationship can be identified, for example, using the value in the key fields. In addition, the template structure of the web pages can be determined using the identified key field(s). In one embodiment, the associated semantic types of the content of the web pages can be determined using the template structure. For example, in screenshot 800, using the template, Relacore can be associated with type 'vitamins' 804. In screenshot 850, Tylenol can be associated with type 'medicine' 850. Yet further, based on the comparison of the two web pages, it can be determined that each item page has a similar structure and is associated with the same sub-types ("product details", "ingredients", "reviews", and "directions").

Figure 9:
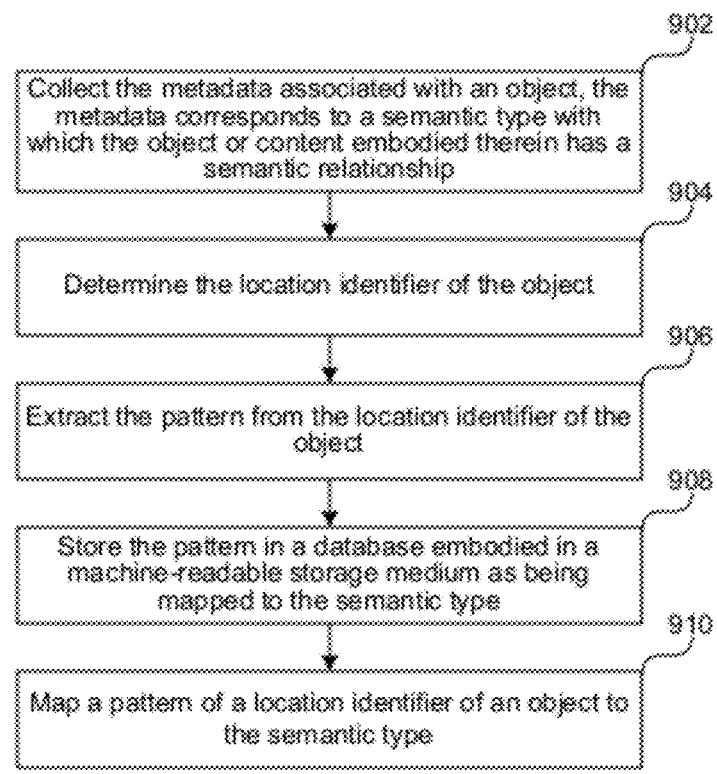
FIG. 9 depicts a flow chart illustrating an example process for mapping a pattern of a location identifier of an object to a semantic type using object metadata.

FIG. 9 depicts a flow chart illustrating an example process for mapping a pattern of a location identifier of an object to a semantic type using object metadata.

In process 902, the metadata associated with an object is collected. The object may be a web page and the location identifier can be a URL or URI. The metadata generally corresponds to the semantic type with which the object or content embodied therein has a semantic relationship. The metadata can be collected from content sources hosted by host servers and/or the object itself. In general, each content source includes at least a portion of the object or a reference to the object that is associated with the location identifier.

For example, the metadata can be collected from one or more of, bookmarked content and blog articles, and/or a social networking site/utility. In some instances, the metadata is collected from analyzing user behavior and can included user-generated or user-identified metadata. In general, user-generated or user-identified metadata includes tags, user reviews, user comments, blog entries, and/or user annotation, for example.

Note that the semantic relationship can specify a type of thing or concept that the content embodied in the object is relevant to (e.g., an "is-a" relationship). The semantic relationship can also specify a type of format that the content embodied in the object is of (e.g., a "has-format" relationship). The semantic relationship may also be an "has-audience" relationship that specifies a type of audience that the content embodied in the object is intended for. In addition, the semantic relationship can specify a set of semantic tags that the content embodied in the object is relevant to, a web site where the object is from (e.g., a "has-domain" relationship), or the popularity of the content embodied in the object.

In process 904, the location identifier of the object is determined. In process 906, the pattern is extracted from the location identifier of the object. In some instances, the metadata has an associated weighting and the pattern extracted from the location identifier has a trustworthiness rating that corresponds to the associated weighting of the metadata.

In process 908, the pattern is stored in a database embodied in a machine-readable storage medium as being mapped to the semantic type. The pattern can be subsequently by retrieved from the database and used to search for other location identifiers also having a pattern matching the pattern for locating other objects or other objects including content embodied therein, that have the semantic relationship to the semantic type.

In one embodiment, multiple tags identified from the content sources are analyze and a subset of the multiple tags can be selected for use in identifying a set of semantic types with which the object or the content embodied therein has a semantic relationship. The tags can be selected when a usage frequency of a particular tag exceeds a threshold value. For example, the usage frequency of the particular tag can be indicated by a number of times or a percentage of times the object or the content embodied in the object has been associated with a particular tag.

The tags can also be selected based on the weights assigned to each of the multiple tags. In one embodiment, weights are assigned to each of the multiple tags. The weight for a particular tag of the multiple tags can be assigned based a rating of a user who identified the particular tag. The user rating can be determined based on, for example, an interest of the user, social endorsement of the user by other users, expertise of the user, and/or reliability of the user. In addition, the rating of the user can also be determined based on similarity of tags identified by the user compared to tags identified by other users for a same set of content.

The set of semantic types that correspond to one or more of the subset of multiple tags can be identified and stored. The stored pattern generally corresponds to the each of the set of semantic types with which the object or the content embodied therein has a semantic relationship. In addition, the location identifier and/or the pattern can be indexed in the database as being mapped to each of the semantic types.

In process 910, a pattern of a location identifier of an object to is mapped to the semantic type. The system can receive a search query from a user, for example, via a user interface. In response to receiving a search query, the system maps the search query into the pattern and a search for other location identifiers having a pattern that matches the specified pattern can be performed. In one embodiment, a second pattern of another URL of another web page in the same web site which is also associated with the metadata can also be extracted based on a comparison with the URL of the web page.

Figure 10A:
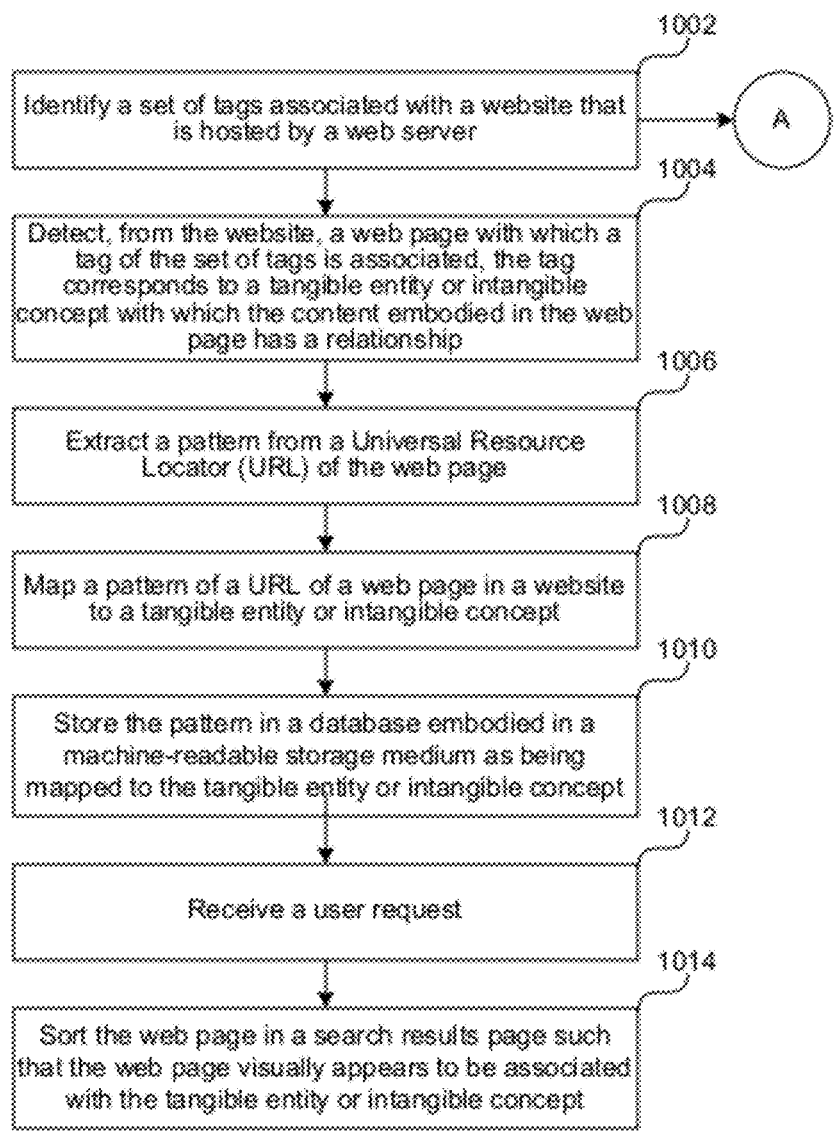
FIG. 10A depicts a flow chart illustrating an example process for sorting a web page in a search results page such that the web page visually appears to be associated with a tangible entity or intangible concept.

FIG. 10A depicts a flow chart illustrating an example process for sorting a web page in a search results page such that the web page visually appears to be associated with the tangible entity or intangible concept.

In process 1002, a set of tags associated with a website are identified. In process 1004, a web page with which a tag of the set of tags is associated is detected from the website. The tag generally corresponds to a tangible entity or intangible concept (e.g., represented by a semantic type) with which the content embodied in the web page has a relationship (e.g. semantic relationship).

In process 1006, a pattern is extracted from a Universal Resource Locator (URL) of the web page. In process 1008, a pattern in a URL of a web page in a website is mapped to a tangible entity or intangible concept. In process 1010, the pattern is stored in a database embodied in a machine-readable storage medium as being mapped to the tangible entity or intangible concept. In one embodiment, the tag has an associated weight value and that the trustworthiness of the pattern extracted from the URL is rated based on the associated weight value of the tag that is identified in the web page having the URL.

In process 1012, a user request is received. In process 1014, the web page is sorted in a search results page such that the web page visually appears to be associated with the tangible entity or intangible concept.

Figure 10B:
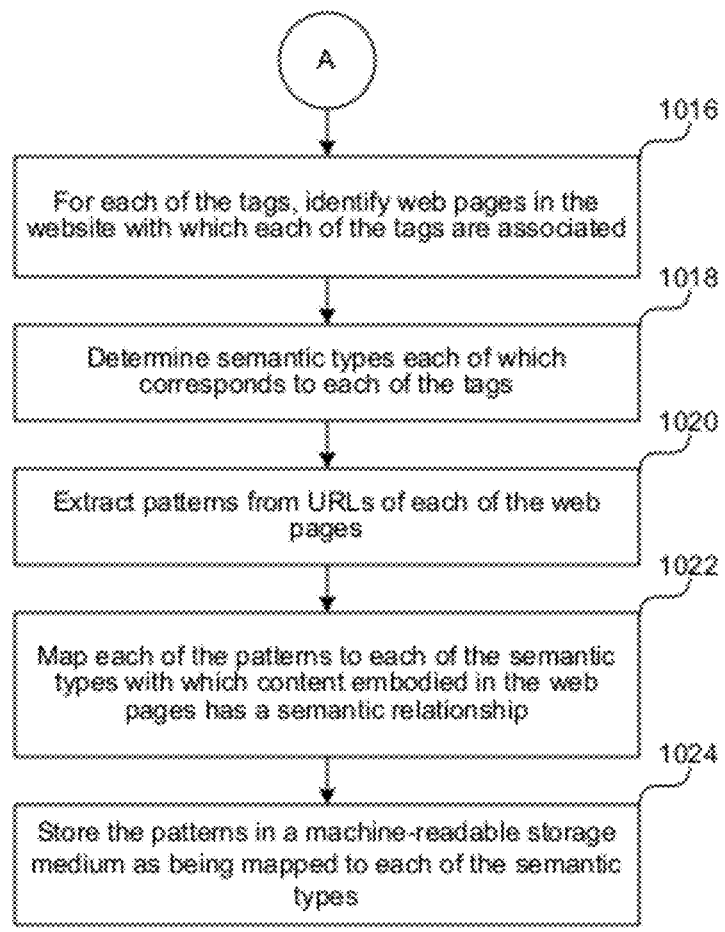
FIG. 10B depicts a flow chart illustrating an example process for mapping a URL pattern to a semantic type using tags associated with the URL host site.

FIG. 10B depicts a flow chart illustrating an example process for mapping a URL pattern to a semantic type using tags associated with the URL host site.

In process 1016, web pages in the website with which each of the tags are associated are identified for each of the tags. In process 1018, semantic types, each of which corresponds to each of the tags, are determined. In process 1020, patterns are extracted from URLs of each of the web pages. In process 1022, each of the patterns is mapped to each of the semantic types with which content embodied in the web pages has a semantic relationship. In process 1024, the patterns are stored in a machine-readable storage medium as being mapped to each of the semantic types.

Figure 11A:
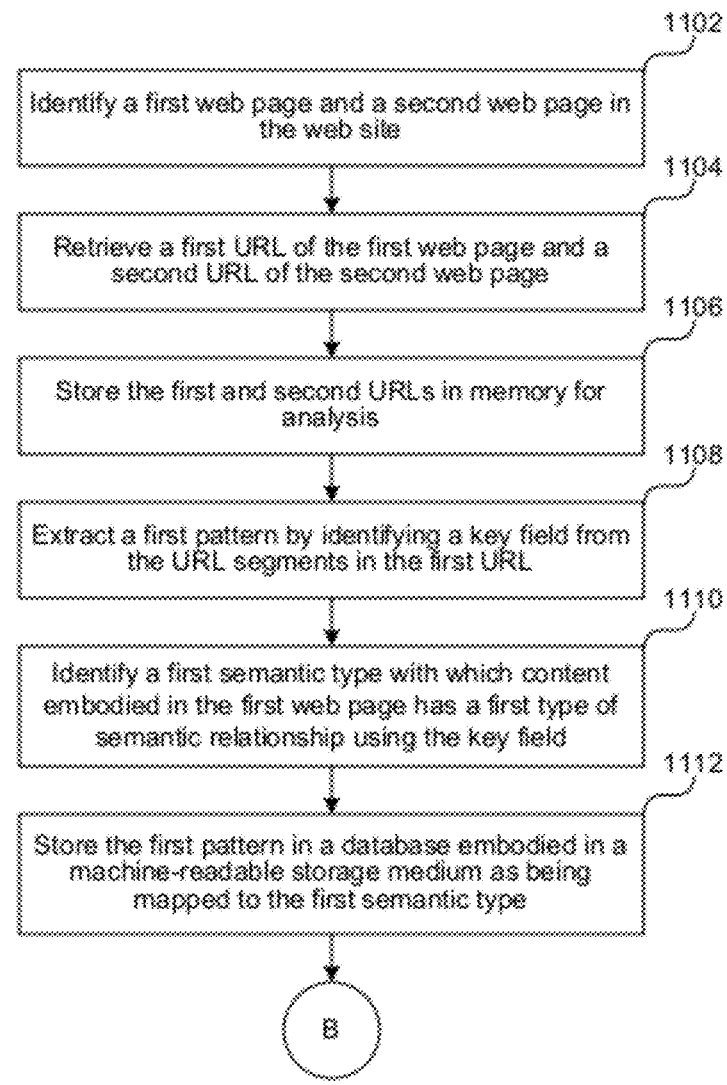
FIG. 11A-B depicts a flow chart illustrating an example process for mapping a URL pattern to a semantic type with which the content has a semantic relationship using a key field in the segments of the URL.
Figure 11B:
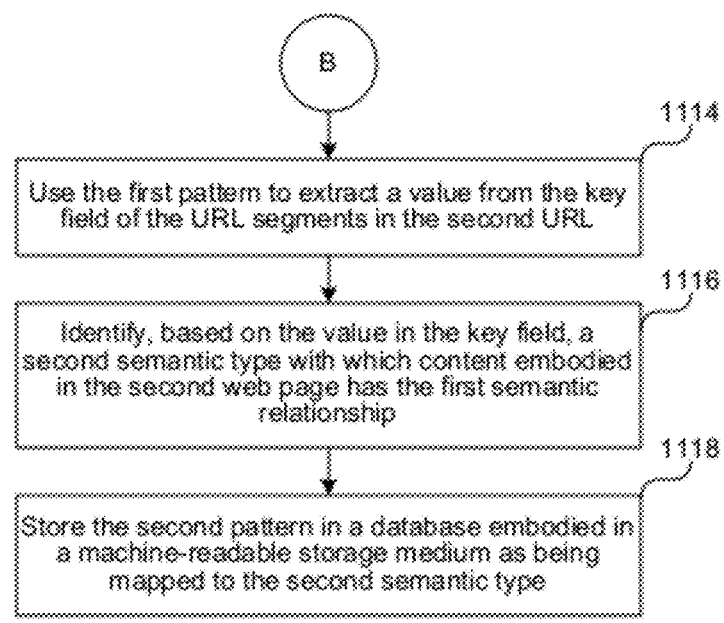

FIG. 11A-B depicts a flow chart illustrating an example process for mapping a URL pattern to a semantic type with which the content has a semantic relationship using a key field in the segments of the URL.

In process 1102, a first web page and a second web page in the web site are identified. The first and second web pages may be item detail pages and the web site maybe selected from a set of candidate web sites. For example, the web site can be selected from the set of candidate web sites based on user behavior related to the web site. User behavior may include by way of example but not limitation, one or more of, number of user visits, number of bookmarks of web pages in the web site, number of shares with other users, and/or number of mentions via a social networking utility.

In process 1104, a first URL of the first web page and a second URL of the second web page are retrieved. In process 1106, the first and second URLs are stored in memory for analysis. The URL segments in the first and second URLs and corresponding values in each field can be compared. In process 1108, a first pattern is extracted by identifying a key field from the URL segments in the first URL.

In process 1110, a first semantic type with which content embodied in the first web page has a first type of semantic relationship is identified, using the key field. In process 1112, the first pattern is stored in a database embodied in a machine-readable storage medium as being mapped to the first semantic type. In addition, based on the comparison of the two URLs, a template structure of the first web page can be determined. The key field may determine a layout of the template structure and the first semantic type can be identified from the layout of the template structure.

In one embodiment, another semantic type can be identified from one or more of, the key field, another key field, and the layout and that the content embodied in the first web page has another type of semantic relationship with the another semantic type.

In process 1114, the first pattern is used to extract a value from the key field of the URL segments in the second URL. In process 1116, based on the value in the key field, a second semantic type with which content embodied in the second web page has the first semantic relationship is identified. For example, using a known ontology class of a web site, the item detail pages can be analyzed to determine semantic type candidates. In process 1118, the second pattern is stored in a database embodied in a machine-readable storage medium as being mapped to the second semantic type.

In addition, using a tag associated with the first web page, a third semantic type with which content embodied in the first web page has a third type of semantic relationship with is identified.

Figure 12:
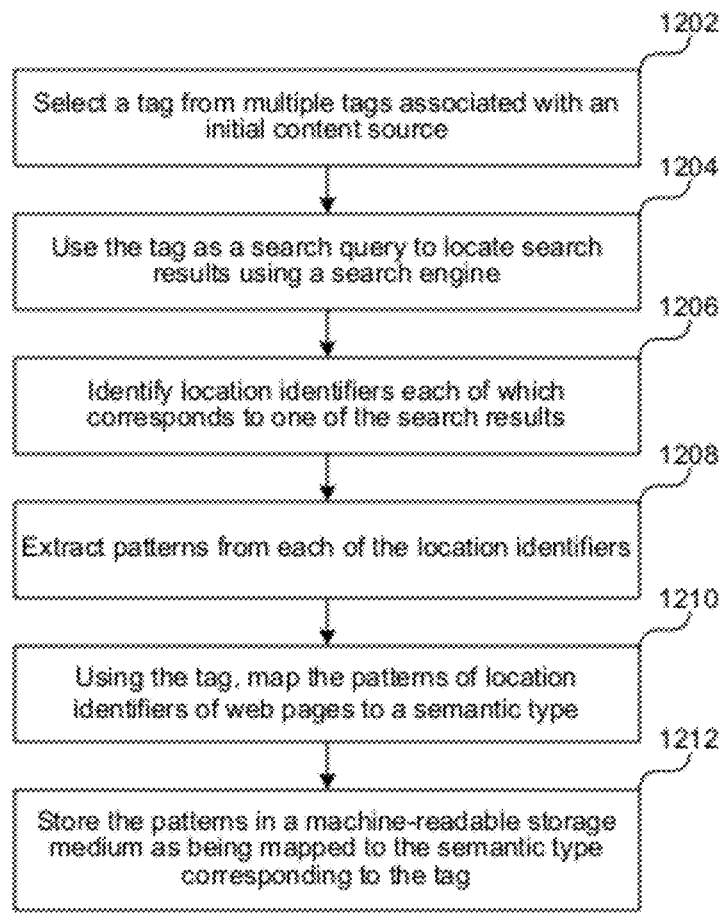
FIG. 12 depicts a flow chart illustrating an example process for mapping the patterns of location identifiers of web pages to a semantic type using a tag selected from content sources.

FIG. 12 depicts a flow chart illustrating an example process for mapping the patterns of location identifiers of web pages to a semantic type using a tag selected from content sources.

In process 1202, a tag is selected from multiple tags associated with an initial content source. The tag can be selected in response to determining that the location identifier of the initial content source includes a segment having the tag or selected in response to determining that the initial content source includes text comprising the tag. In addition, the tag may be selected in response to determining that XHTML or HTML of the initial content source includes text comprising the tag.

In process 1204, the tag is used as a search query to locate search results using a search engine. In one embodiment, the set of search results are selected from a larger pool of search results identified using the search query.

In process 1206, location identifiers each of which corresponds to one of the search results are identified. In process 1208, patterns from each of the location identifiers are extracted. In process 1210, the patterns of location identifiers of web pages are mapped to a semantic type using the tag.

In process 1212, the patterns are stored in a machine-readable storage medium as being mapped to the semantic type corresponding to the tag. Each of the set of patterns generally corresponds to the semantic type with which content embodied in each of the set of search results has a semantic relationship.

Figure 13:
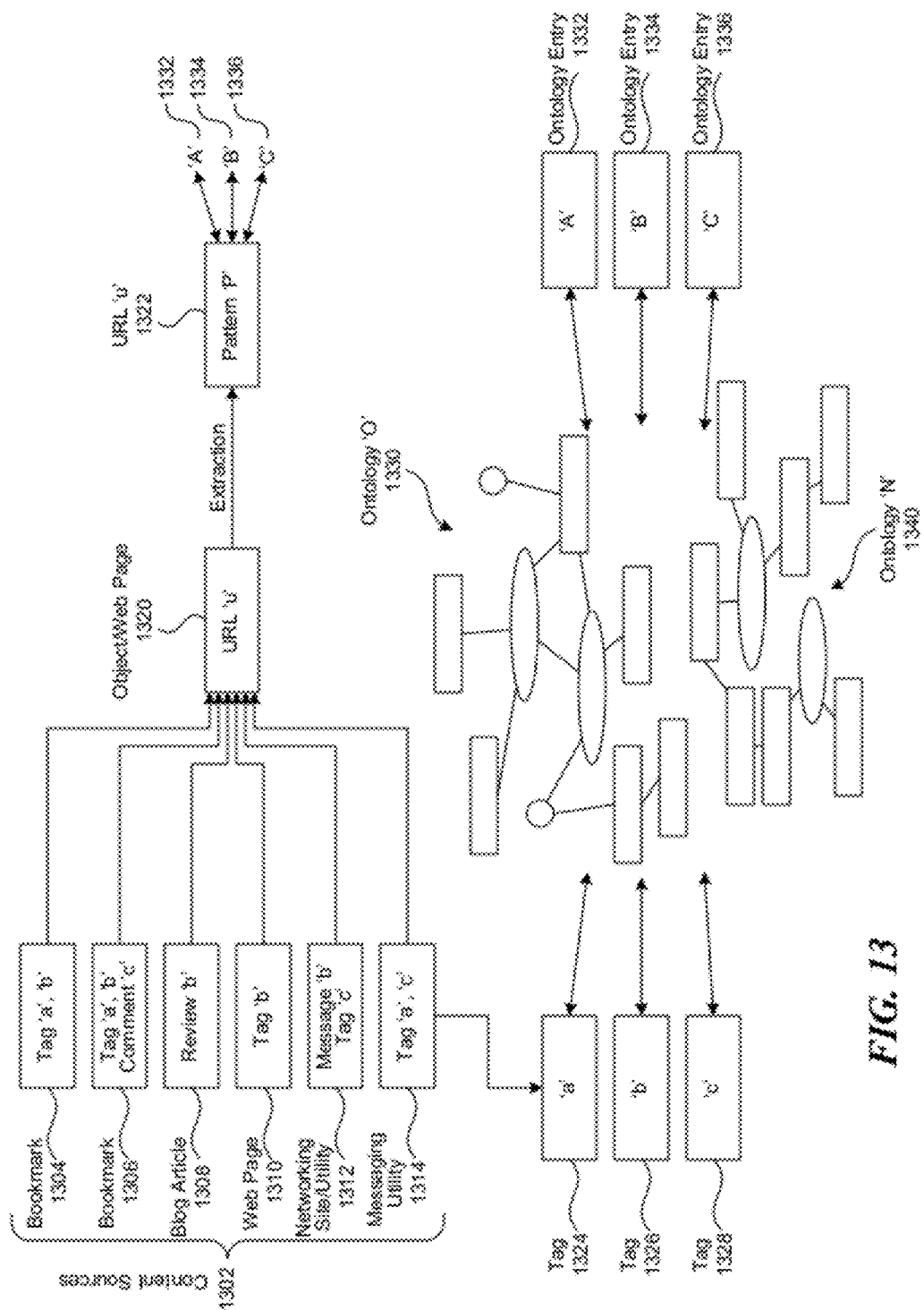
FIG. 13 depicts a diagrammatic representation of using metadata associated with an object obtained from various content sources to map the object's location identifier pattern to semantic types determined using an ontology.

FIG. 13 depicts a diagrammatic representation of using metadata associated with an object obtained from various content sources 1302 to map the object's location identifier pattern 1322 to semantic types determined using on or more ontologies 1330 or 1340.

The content sources 1302 can include, for example, bookmarks 1304 and 1306, a blog article 1308, a web page 1310, a networking site/utility 1312, and/or a messaging utility 1314. The content sources 1302 are identified as having content that refers to or otherwise references the object 1330 (e.g., a web page) having electronic content. Metadata that is associated with the object 1320 can be extracted from the content sources 1302. For example, the bookmarked content 1304 includes a tag 'a' and a tag 'b'. The bookmark 1306 includes tags 'a', 'b', and a comment with 'c'. The blog article 1308 includes a review with 'b' and the web page 1310 includes tag 'b'. The networking site/utility 1312 includes a message with 'b' and a tag 'c', and the messaging utility 1314 includes the tag 'a' and 'c'.

The metadata can be identified from the content sources 1302 to determine associated semantic types. Each of the metadata (e.g., tag 'a', 'b', and 'c') can be extracted from the content sources 1302 for use in extracting a pattern from the location identifier (e.g., URL 'U') of the web page object 1320. In addition, the extracted metadata (e.g., tag 'a' 1324, tag 'b' 1326, and tag 'c' 1328') are mapped to ontology entries (e.g., ontology entry 'A' 1332, ontology entry 'B' 1334, and ontology entry 'C' 1336) using one or more ontologies or taxonomies (e.g., ontology 'O' 1330 and/or ontology 'N' 1340).

Note that not all metadata (e.g., all of tag 'a', 'b', and 'c') need to be used in pattern extraction and ontology entry mapping. For example, the metadata that is selected for use in further analysis may be identified based on usage frequency. Tag 'b' may be the only metadata selected for further analysis, tags 'a' and 'b' may both be selected based on usage frequency, depending on the application and the threshold for selection.

Once a pattern (e.g., pattern 'P') has been extracted from the URL 'U' 1322 of the web page object 1320, the pattern can be associated with the identified semantic types linked to entry 'A' 1332, entry 'B' 1334, and/or entry 'C' 1336. In some instances, multiple patterns may be extracted from URL 'U' 1322 and each can be associated with semantic types linked to entries 'A' 1332, 'B' 1334, and/or 'C' 1336.

Alternatively, the content sources 1302 include content that refer to or otherwise reference a web site containing the web page object 1320 includes the tags 'a', 'b', and 'c'. In this situation, multiple patterns can be extracted from the web page objects in the website and individually to each of types 'A', 'B', 'C' or each pattern can be linked to a combination of the above listed semantic types, as depicted in the example diagram of FIG. 14.

Figure 14:
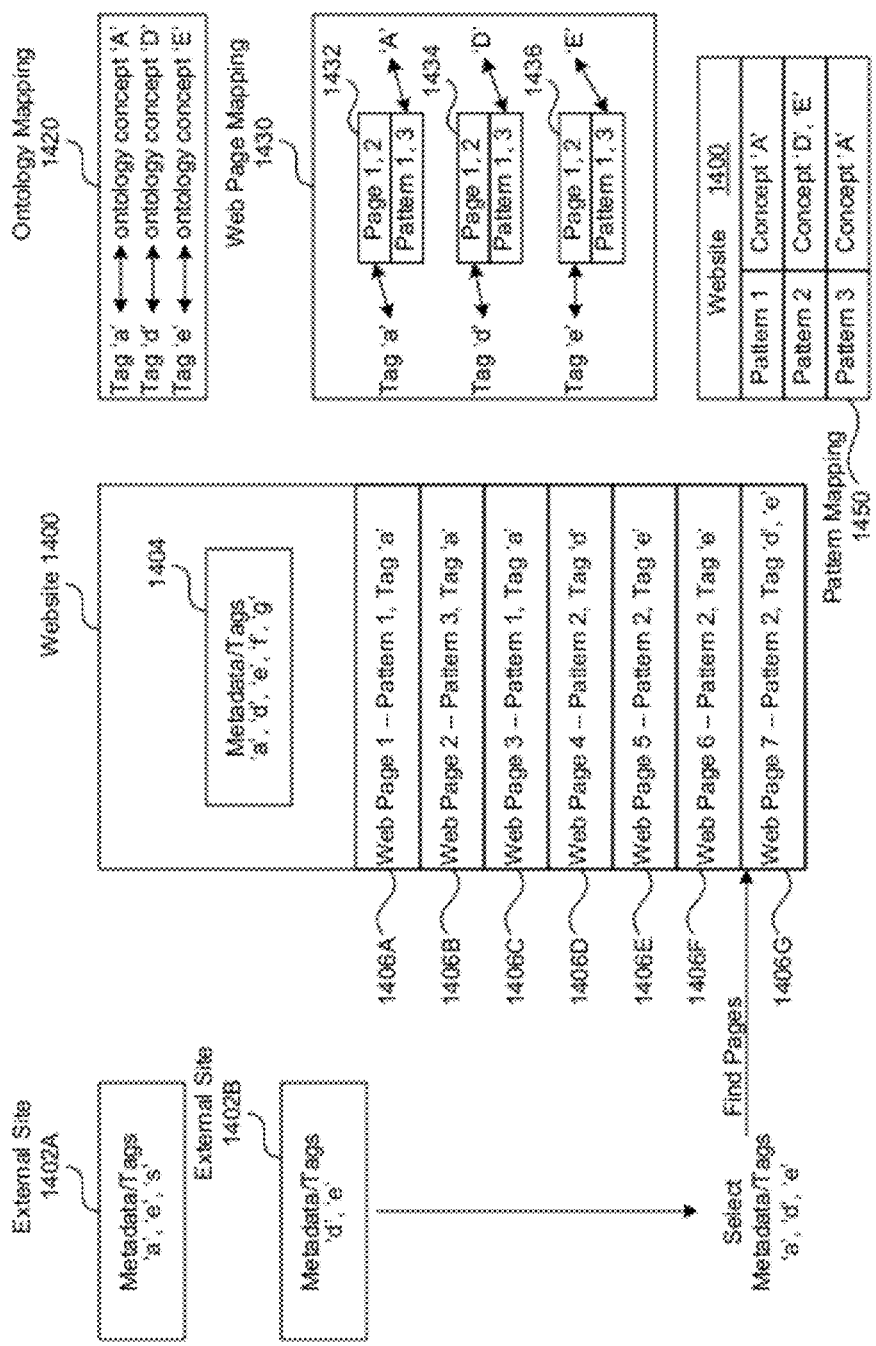
FIG. 14 depicts a diagrammatic representation of using external and internal metadata associated with a website to extract URL patterns from web pages in the website and to map the URL patterns to semantic types ontologically identified using the external/internal metadata.

FIG. 14 depicts a diagrammatic representation of using external 1402 and internal 1404 metadata associated with a website 1400 to extract URL patterns from web pages 1406 in the website and to map the URL patterns to semantic types ontologically identified using the external/internal metadata.

In some instances, a web site 1400 includes metadata/tags 1404 that are identified within the web site 1400. For example, via user comments, reviews, and/or tags provided to content in various pages on the web site 1400. In addition, the web site 1400 can be referred to or otherwise referenced by external sources such as external sites 1402A and 1402B.

Metadata pertaining to the web site 1400 can be extracted from the internal source 1404 and/or external sources 1402A/B. In some instances, the extracted metadata can be further filtered/selected based on relevancy to the content. Relevancy can be determined, for example, in part by popularity (e.g., usage frequency). In the example of FIG. 14, the most frequently identified metadata (e.g., tags) in both external and internal sources are selected (e.g., 'a', 'd', and 'e').

The web pages of the website 1400 can then be analyzed to identify which of the selected tag(s) are relevant to the content. For example, the tag can be identified as being relevant to a particular page if the word(s) in the tag appear in the content of the web page (e.g., either in text, audible, or other electronic forms). The tag can also be identified as being relevant if internal metadata corresponding to the same web page includes the same tag. In the example of FIG. 14, each web page 1-14 has been associated with one or more of the tags (e.g., tags a', 'd', and 'e') selected from the internal 1404 and external 1402 metadata set. In addition, a pattern can be extracted from each of web pages 1-7 in the web site 1400.

In the ontology mapping table 1420, the selected metadata/tags are mapped to ontology concepts in one or more ontologies or taxonomies. For example, the tag 'a' maybe mapped to ontology concept 'A', the tag 'b' may be mapped to 'B', and tag 'e' may be mapped to concept 'E'.

Further, using the identified relevancy of each of the selected metadata/tags to web pages 1-7 in the web site 1400, the ontology concepts and their defined semantic types can be linked to the patterns. For example, the table with web page mappings 1430 shows the association of the selected metadata/tags with various web pages in the web site 1400. For example, in 1432, tag 'a' is shown to be associated with web pages 1 and 2 due to identified relevance. Since URL patterns 1 and 3 are extracted from web pages 1 and 2 and that tag 'a' is mapped to concept 'A', then patterns 1 and 3 can be associated with concept 'A' and the defined semantic type, as shown in the table of pattern mappings 1450.

Similarly, in 1434, tag 'd' is shown to be associated with web pages 4 and 5 due to identified relevance. Since URL pattern 2 extracted from web pages 4 and 5 and that tag 'd' is mapped to concept 'D', then pattern 2 can be associated with concept 'D' and the defined semantic type, as shown in the table of pattern mappings 1450. Based on a similar mapping process, pattern 2 can also be mapped to concept 'E', as shown in table 1450.

Therefore, in the web site 1400, the pattern 1 can be used to search for other web pages having content of or having a semantic relationship to concept 'A' and its associated semantic type; pattern 2 can be used pattern 1 can be used to search for other web pages having content of or having a semantic relationship to concept 'D' and 'E' and its associated semantic type; and pattern 3 can be used to search for other web pages having content of or having a semantic relationship to concept 'A' and its associated semantic type.

Figure 15:
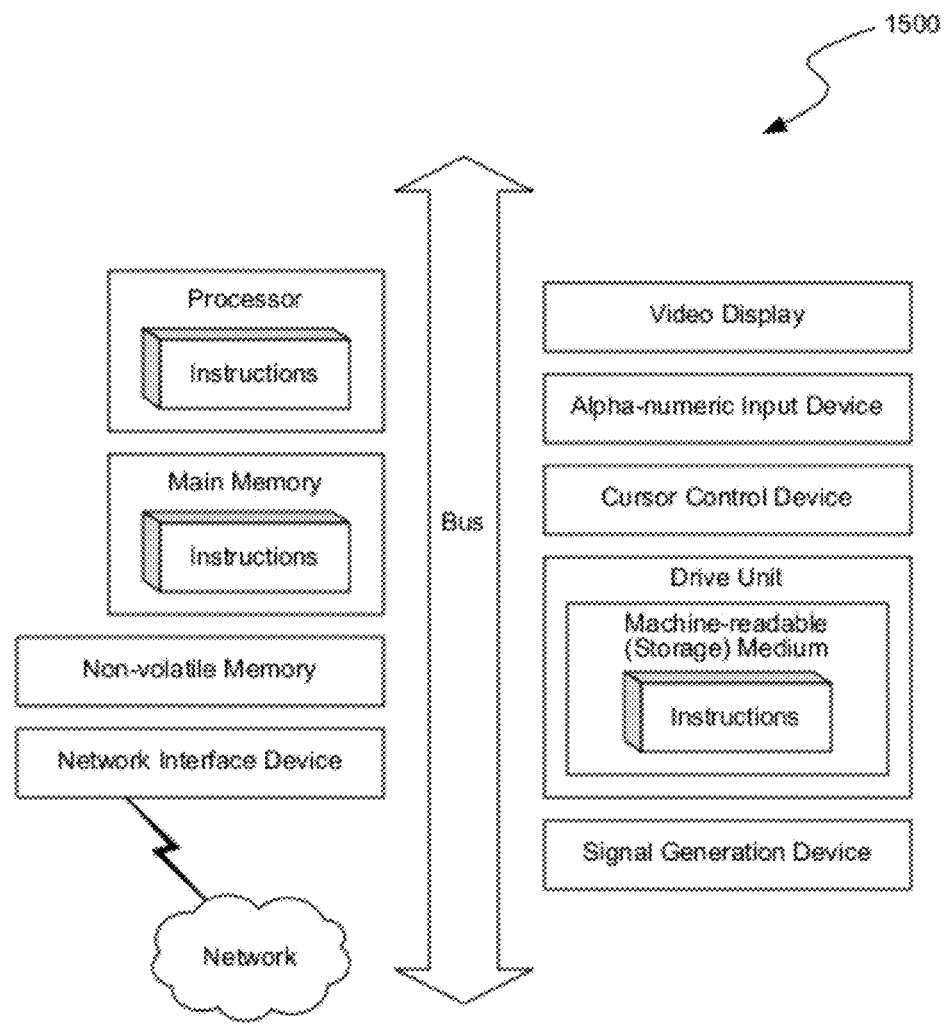
FIG. 15 shows a diagrammatic representation of a machine in the example form of a computer system within which a set of instructions, for causing the machine to perform any one or more of the methodologies discussed herein, may be executed.

FIG. 15 shows a diagrammatic representation of a machine in the example form of a computer system 1500 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicants reserve the right to add additional claims after filing the application to pursue such additional claim forms for other aspects of the disclosure.

What is claimed is:

1. A method performed by a computer system having a processor of automatically mapping a pattern related to a location identifier of an object having content in the Web to a semantic type using metadata associated with the object, the method, comprising:
    collecting the metadata from, one or more of, a plurality of content sources hosted by host servers and the object itself, wherein each of the plurality of content sources includes at least a portion of the object or a reference to the object associated with the location identifier;
    creating, by a processor, the pattern from the location identifier of the object in the Web,
    wherein the pattern is not identical to the location identifier and is used to search for other location identifiers of objects in the Web,
    wherein the metadata corresponds to the semantic type with which the content of the object has a semantic relationship, the metadata having an associated weighting; and
    storing, by the processor, the pattern in a database embodied in a machine-readable storage medium as being mapped to the semantic type;
    receiving via a user interface a search query associated with the semantic type;
    mapping the search query into the pattern stored in the database based on the semantic type; and
    performing a search for the other location identifiers matching the pattern for locating other objects or other objects including content embodied therein, that have the semantic relationship to the semantic type.

2. The method of claim 1,
    wherein, the pattern created from the location identifier has a trustworthiness rating that corresponds to the associated weighting of the metadata.

3. The method of claim 1, wherein, the metadata is collected from web content including one or more of, bookmarked content and blog articles.

4. The method of claim 1, wherein, the metadata is collected from a social networking site.

5. The method of claim 1, wherein, the metadata is collected from analyzing user behavior.

6. The method of claim 1, wherein, the metadata includes user-generated or user-identified metadata.

7. The method of claim 6, wherein, the user-generated or user-identified metadata includes one or more tags.

8. The method of claim 6, wherein, the user-generated or user-identified metadata includes user reviews or user annotation.

9. The method of claim 1, further comprising,
analyzing multiple tags identified from the plurality of content sources;
selecting a subset of the multiple tags for use in identifying a set of semantic types with which the object or the content embodied therein has a semantic relationship.

10. The method of claim 9, further comprising,
identifying the set of semantic types, each of which corresponds to one or more of the subset of the multiple tags; and updating the mapping stored in the machine-readable storage medium to include each of the set of semantic types.

11. The method of claim 10, further comprising, indexing the location identifier as being mapped to each of the set of semantic types.

12. The method of claim 9, further comprising, assigning weights to each of the multiple tags.

13. The method of claim 12, wherein, the subset of the multiple tags is selected based on the weights assigned to each of the multiple tags.

14. The method of claim 9, wherein, a weight for a particular tag of the multiple tags is assigned based on a rating of a user who identified the particular tag.

15. The method of claim 14, wherein, the rating of the user is determined based on an interest of the user.

16. The method of claim 14, wherein, the rating of the user is determined based on one or more of, social endorsement of the user by other users, expertise of the user, and reliability of the user.

17. The method of claim 14, wherein, the rating of the user is determined based on similarity of tags identified by the user compared to tags identified by other users for a same set of content.

18. The method of claim 9, wherein, each of the subset of the multiple tags is selected when a usage frequency of the tag exceeds a threshold value.

19. The method of claim 18, wherein, the usage frequency of the particular tag is a number of times or a percentage of times the object or the content embodied in the object has been associated with a particular tag.

20. The method of claim 1,
wherein, the object is a web page;
wherein, the location identifier is a Universal Resource Locator (URL).

21. The method of claim 20, further comprising,
identifying a second URL having a same domain as the location identifier;
wherein, the second URL links to a second web page having content embodied therein that is also associated with the metadata;
extracting the pattern by comparing the URL with the second URL.

22. The method of claim 1, wherein, the object is visually sorted in a search results page according to the semantic relationship with the semantic type.

23. The method of claim 1, wherein, the semantic relationship specifies a type of thing or concept that the content embodied in the object is relevant to.

24. The method of claim 23, wherein, the semantic relationship includes, an "is-a" relationship.

25. The method of claim 1, wherein, the semantic relationship specifies a type of format that the content embodied in the object is of.

26. The method of claim 25, wherein, the semantic relationship includes, a "has-format" relationship.

27. The method of claim 1, wherein, the semantic relationship specifies a type of audience that the content embodied in the object is intended for.

28. The method of claim 27, wherein, the semantic relationship includes, a "has-audience" relationship.

29. The method of claim 1, wherein, the semantic relationship specifies a language that the content embodied in the object is in.

30. The method of claim 29, wherein, the semantic relationship includes, an "of-language" relationship.

31. The method of claim 1, wherein, the semantic relationship specifies a set of semantic tags that the content embodied in the object is relevant to.

32. The method of claim 1, wherein, the semantic relationship specifies a web site where the object is from.

33. The method of claim 32, wherein, the semantic relationship includes, a "has-domain" relationship.

34. The method of claim 1, wherein, the semantic relationship specifies popularity of the content embodied in the object.

35. A method for automatically mapping a pattern related to a Universal Resource Locator (URL) of a web page in a website to a semantic type, the method, comprising:
detecting, by a processor, a web page with which a tag is associated,
wherein the tag corresponds to a semantic type with which the content embodied in the web page has a semantic relationship;
extracting a pattern from a URL of the web page, wherein the pattern is not identical to the URL and is used to search for other URLs of web pages;
storing an association of the pattern with the semantic type in a database;
receiving via a user interface a search query associated with the semantic type;
mapping the search query into the pattern stored in the database based on the semantic type; and
performing a search for other location identifiers matching the pattern for locating other web pages or other web pages including content embodied therein, that have the semantic relationship to the semantic type.

36. The method of claim 35, wherein, the semantic relationship specifies a type of thing or concept that the content embodied in the web page is relevant to.

37. The method of claim 35, wherein, the semantic relationship specifies a type of format that the content embodied in the web page is of.

38. The method of claim 35, wherein, the semantic relationship specifies a type of audience that the content embodied in the web page is intended for.

39. The method of claim 35, wherein, the semantic relationship specifies a language that the content embodied in the web page is in.

40. The method of claim 35, wherein, the semantic relationship specifies a set of tags that the content embodied in the web page is relevant to.

41. The method of claim 40, further comprising:
for each of the set of tags, identifying at least one web page in the website with which the tag is associated;
determining a set of semantic types each of which corresponds to each of the set of tags;

extracting a set of patterns from URLs of each of the at least one web page; and storing each of the set of patterns in a machine-readable storage medium as being mapped to each of the set of semantic types.

42. The method of claim 35, wherein, the semantic relationship specifies a domain where the web page is from.

43. The method of claim 35, further comprising, in response to receiving a user request, sorting the web page in a search results page such that the web page visually appears to be associated with the semantic type.

44. The method of claim 35, wherein, the tag has an associated weight value.

45. The method of claim 44, further comprising, rating trustworthiness of the pattern extracted from the URL based on the associated weight value of the tag that is identified in the web page having the URL.

46. A method for automatically mapping patterns of Universal Resource Locators (URLs) of web pages on a website to one or more semantic types, the method, comprising:

identifying a first web page and a second web page in the web site;

retrieving a first URL of the first web page and a second URL of the second web page;

storing the first and second URLs in memory for analysis;

comparing URL segments in the first and second URLs and corresponding values in each field;

extracting a first pattern from the first URL;

using a key field from the URL segments in the first URL, identifying a first semantic type with which content embodied in the first web page has a first type of semantic relationship;

storing the first pattern in a database embodied in a machine-readable storage medium as being mapped to the first semantic type;

receiving via a user interface a search query associated with the first semantic type;

mapping the search query into the first pattern stored in the database based on the first semantic type; and performing a search for other location identifiers matching the first pattern for locating other web pages or other web pages including content embodied therein, that have the first type of semantic relationship to the first semantic type.

47. The method of claim 46, further comprising, determining a template structure of the first web page based on the comparison;

wherein, the key field determines a layout of the template structure;

wherein, the first semantic type is identified from the layout of the template structure.

48. The method of claim 47, further comprising, identifying, from one or more of, the URL segments, another key field, a corresponding layout, and a corresponding semantic type, wherein, the content embodied in the first web page has another type of semantic relationship with the another semantic type.

49. The method of claim 46, further comprising, identifying, using a tag associated with the first web page, a second semantic type, wherein, the content embodied in the first web page has a second type of semantic relationship with the second semantic type.

50. The method of claim 46, further comprising:

using the first pattern, extracting a value from a key field of the URL segments in the second URL;

identifying, based on the value in the key field, a second semantic type with which content embodied in the second web page has the first type of semantic relationship.

51. The method of claim 46, wherein, the first and second web pages are item detail pages.

52. The method of claim 46, wherein, the web site is selected from a set of candidate web sites.

53. The method of claim 52, wherein, the web site is selected from the set of candidate web sites based on user behavior related to the web site.

54. The method of claim 53, wherein, the user behavior includes, one or more of, a number of user visits and a number of bookmarks of web pages in the web site.

55. The method of claim 53, wherein, the user behavior includes, one or more of, a number of shares with other users and a number of mentions via a social networking utility.

56. A method for mapping patterns of location identifiers of web pages to a semantic type using a tag, the method, comprising:

selecting the tag from multiple tags associated with an initial content source;

identifying a set of search results of a search query comprising the tag using a search engine;

creating a set of patterns from each of a set of location identifiers corresponding to the set of search results;

associating the set of patterns with a semantic type corresponding to the tag; and storing the association in a database on a machine-readable storage medium;

receiving via a user interface a search query associated with the semantic type;

mapping the search query into the pattern stored in the database based on the semantic type; and performing a search for other location identifiers matching the pattern for locating other web pages or other web pages including content embodied therein, that have a semantic relationship to the semantic type.

57. The method of claim 56, wherein, the set of search results is selected from a larger pool of search results identified using the search query.

58. The method of claim 56, wherein, the tag is selected in response to determining that the location identifier of the initial content source includes a segment having the tag.

59. The method of claim 56, wherein, the tag is selected in response to determining that the initial content source includes text comprising the tag.

60. The method of claim 56, wherein, the tag is selected in response to determining that XHTML or HTML of the initial content source includes text comprising the tag.

61. A system for automatically mapping a pattern related to a Universal Resource Locator (URL) of a web page in a website to a semantic type, the system having a processor and comprising:

a metadata identifier module to cause the processor to identify a set of tags associated with a website that is hosted by a web server;

an object finder module to cause the processor to detect a web page in the website in which a tag of the set of tags is identified;

a type detection module to cause the processor to determine a semantic type with which the tag corresponds, wherein, the content embodied in the web page has a semantic relationship with the semantic type that corresponds to the tag;

an extraction module to cause the processor to extract a pattern from a URL of the web page,
wherein the pattern is not identical to the URL and is used to search for other URLs;
storing an association of the pattern with the semantic type in a database;
receiving via a user interface a search query associated with the semantic type;
mapping the search query into the pattern stored in the database based on the semantic type; and
performing a search for other location identifiers matching the pattern for locating other web pages or other web pages including content embodied therein, that have the semantic relationship to the semantic type.

62. The system of claim 61, further comprising,
a weighting module to cause the processor to assign a weight to each of the set of tags,
wherein the pattern extracted from the URL has a trustworthiness rating that corresponds to the associated weighting of the tag.

63. The system of claim 61, further comprising,
a metadata analyzer to cause the processor to analyze the set of tags; and
a metadata filter module to cause the processor to extract the tag from the set of tags for use in determining the semantic type with which the pattern extracted from the URL is associated.

64. A non-transitory machine-readable storage medium having stored thereon a set of instructions which when executed perform a method for automatically mapping a pattern related to a location identifier of an object having content in the Web to a semantic type using metadata associated with the object, comprising:

collecting the metadata from one or more of a plurality of content sources hosted by host servers and the object itself,
wherein each of the plurality of content sources includes at least a portion of the object or a reference to the object associated with the location identifier, and
wherein the metadata corresponds to the semantic type with which the object or content embodied therein has a semantic relationship;
extracting the pattern from the location identifier of the object,
wherein the pattern is not identical to the location identifier and is used to search for other location identifiers of objects in the Web;
storing in a database embodied in a machine-readable storage medium a mapping from the pattern to the semantic type;
receiving via a user interface a search query associated with the semantic type;
mapping the search query into the pattern stored in the database based on the semantic type; and
performing a search for other location identifiers matching the pattern for locating other web pages or other web pages including content embodied therein, that have a semantic relationship to the semantic type.

65. The non-transitory machine-readable storage medium of claim 64,
wherein, the metadata has an associated weighting;
wherein, the pattern extracted from the location identifier has a trustworthiness rating that corresponds to the associated weighting of the metadata.

* * * * *